(12) United States Patent
Mizusaki et al.

(10) Patent No.: US 9,034,536 B2
(45) Date of Patent: May 19, 2015

(54) FUEL CELL HAVING VOLTAGE MONITOR TERMINAL WITH EXPOSED PORTION

(75) Inventors: Kimiharu Mizusaki, Wako (JP); Shuhei Goto, Wako (JP); Takaaki Mitsuoka, Wako (JP); Gen Okiyama, Wako (JP); Nobuyoshi Muromoto, Wako (JP); Masayuki Katsuno, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 193 days.

(21) Appl. No.: 13/449,313

(22) Filed: Apr. 18, 2012

(65) Prior Publication Data

US 2012/0270136 A1    Oct. 25, 2012

(30) Foreign Application Priority Data

Apr. 22, 2011 (JP) ................................ 2011-096053

(51) Int. Cl.

| | |
|---|---|
| H01M 8/24 | (2006.01) |
| H01M 8/02 | (2006.01) |
| H01M 8/04 | (2006.01) |
| H01M 8/10 | (2006.01) |

(52) U.S. Cl.
CPC ............. H01M 8/242 (2013.01); *Y02E 60/50* (2013.01); H01M 8/0273 (2013.01); H01M 8/04552 (2013.01); *H01M 2008/1095* (2013.01)

(58) Field of Classification Search
CPC .......... H01M 8/0273; H01M 8/04552; H01M 8/242; H01M 2008/1095; Y02E 60/50
USPC ....................................................... 429/482
See application file for complete search history.

(56) References Cited

U.S. PATENT DOCUMENTS

| | | | |
|---|---|---|---|
| 7,220,511 B2 * | 5/2007 | Nakagawa et al. | 429/432 |
| 7,318,974 B2 * | 1/2008 | Ohara et al. | 429/437 |
| 7,320,846 B2 * | 1/2008 | Watanabe et al. | 429/210 |

(Continued)

FOREIGN PATENT DOCUMENTS

| | | | | |
|---|---|---|---|---|
| CN | 101335356 | | 12/2008 | |
| JP | 2004079193 A | * | 3/2004 | ............. H01M 8/02 |

(Continued)

OTHER PUBLICATIONS

Aritoshi, Toshiaki et al, Connection Structure Between Cell Voltage Measuring Device Side Terminal and Fuel-Cell Side Terminal, Apr. 7, 2005, JPO, pp. 1-10.*

(Continued)

*Primary Examiner* — Milton I Cano
*Assistant Examiner* — Philip A Stuckey
(74) *Attorney, Agent, or Firm* — Mori & Ward, LLP

(57) ABSTRACT

A fuel cell includes an electrolyte electrode assembly, an inner seal member, an outer seal member, a metal separator, and a cell voltage monitor terminal. The electrolyte electrode assembly includes an electrolyte, a pair of electrodes, and a resin frame member. The inner seal member extends around an electrode surface. The outer seal member extends around an outer periphery of the inner seal member. The inner seal member and the outer seal member are disposed on the resin frame member. The cell voltage monitor terminal is embedded in the resin frame member. The cell voltage monitor terminal includes an exposed portion provided between the inner seal member and the outer seal member. The exposed portion is in contact with the metal separator adjacent to the exposed portion.

11 Claims, 29 Drawing Sheets

(56) References Cited

U.S. PATENT DOCUMENTS

| | | | |
|---|---|---|---|
| 7,378,166 B2 * | 5/2008 | Kikuchi et al. | 429/432 |
| 7,416,797 B2 * | 8/2008 | Harada et al. | 429/515 |
| 7,459,228 B2 * | 12/2008 | Aoto | 429/458 |
| 7,510,795 B2 * | 3/2009 | Sakano et al. | 429/406 |
| 7,666,540 B2 * | 2/2010 | Nakanishi et al. | 429/483 |
| 7,687,174 B2 * | 3/2010 | Skala et al. | 429/515 |
| 7,722,977 B2 * | 5/2010 | Sato et al. | 429/465 |
| 7,846,589 B2 * | 12/2010 | Sakano et al. | 429/400 |
| 8,273,494 B2 * | 9/2012 | Kobayashi et al. | 429/465 |
| 8,455,122 B2 * | 6/2013 | Shin et al. | 429/61 |
| 2006/0088740 A1 * | 4/2006 | Sakano et al. | 429/12 |
| 2009/0004539 A1 | 1/2009 | Ishikawa et al. | |
| 2009/0130530 A1 * | 5/2009 | Tanaka | 429/34 |
| 2012/0270136 A1 * | 10/2012 | Mizusaki et al. | 429/482 |
| 2013/0143446 A1 * | 6/2013 | Kobayashi et al. | 439/627 |

FOREIGN PATENT DOCUMENTS

| | | | | |
|---|---|---|---|---|
| JP | 2005-093395 | | 4/2005 | |
| JP | 2005093395 A | * | 4/2005 | H01M 8/04 |
| JP | 2008-140722 | | 6/2008 | |
| JP | 2008140722 A | * | 6/2008 | H01M 8/02 |
| JP | 2010055994 A | * | 3/2010 | H01M 8/02 |
| JP | 2012059563 A | * | 3/2012 | H01M 8/24 |
| JP | 2012227095 A | * | 11/2012 | H01M 8/02 |

OTHER PUBLICATIONS

Chinese Office Action for corresponding CN Application No. 201210100026.4, Jan. 24, 2014.

CNnese Office Action for correspondIng Cn Appiication no. 201210100026.4, Sep. 24, 2014.

* cited by examiner

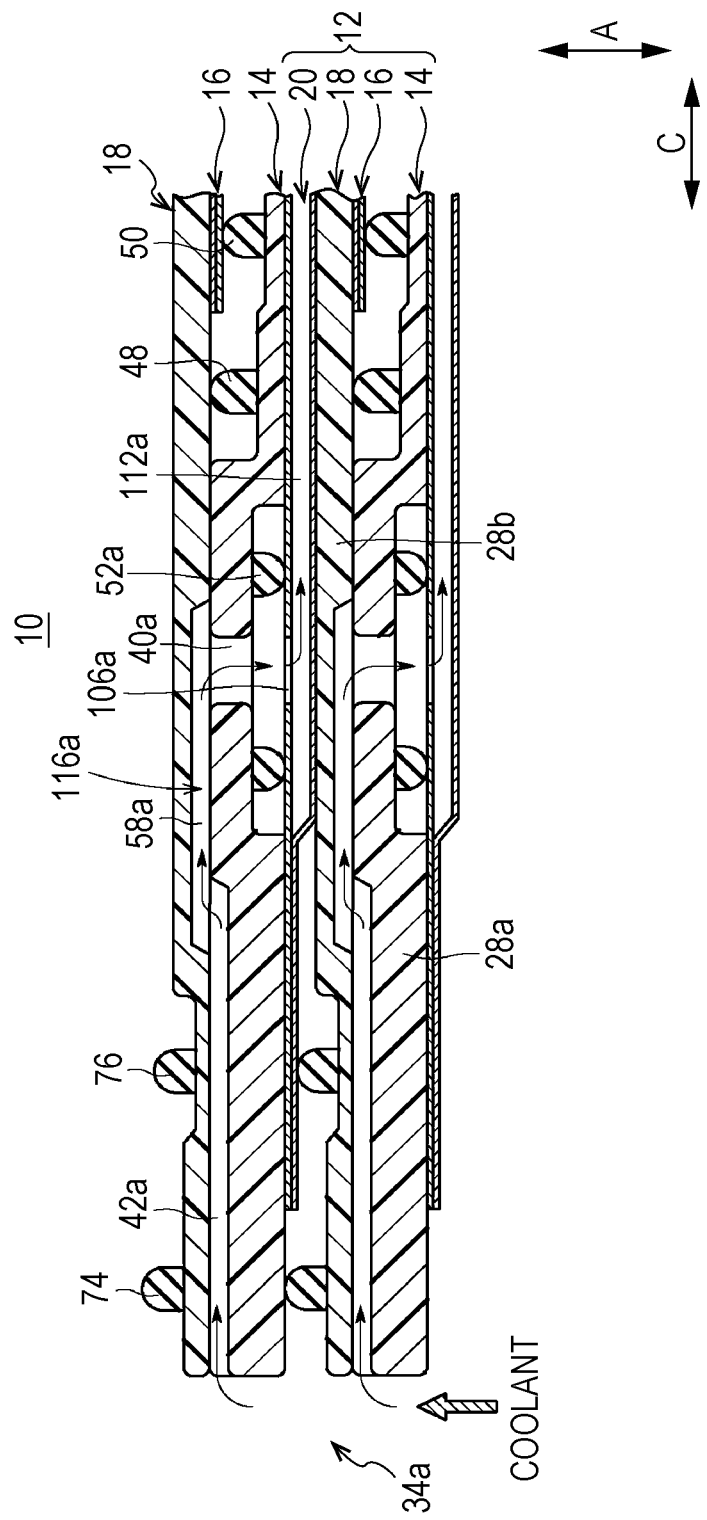

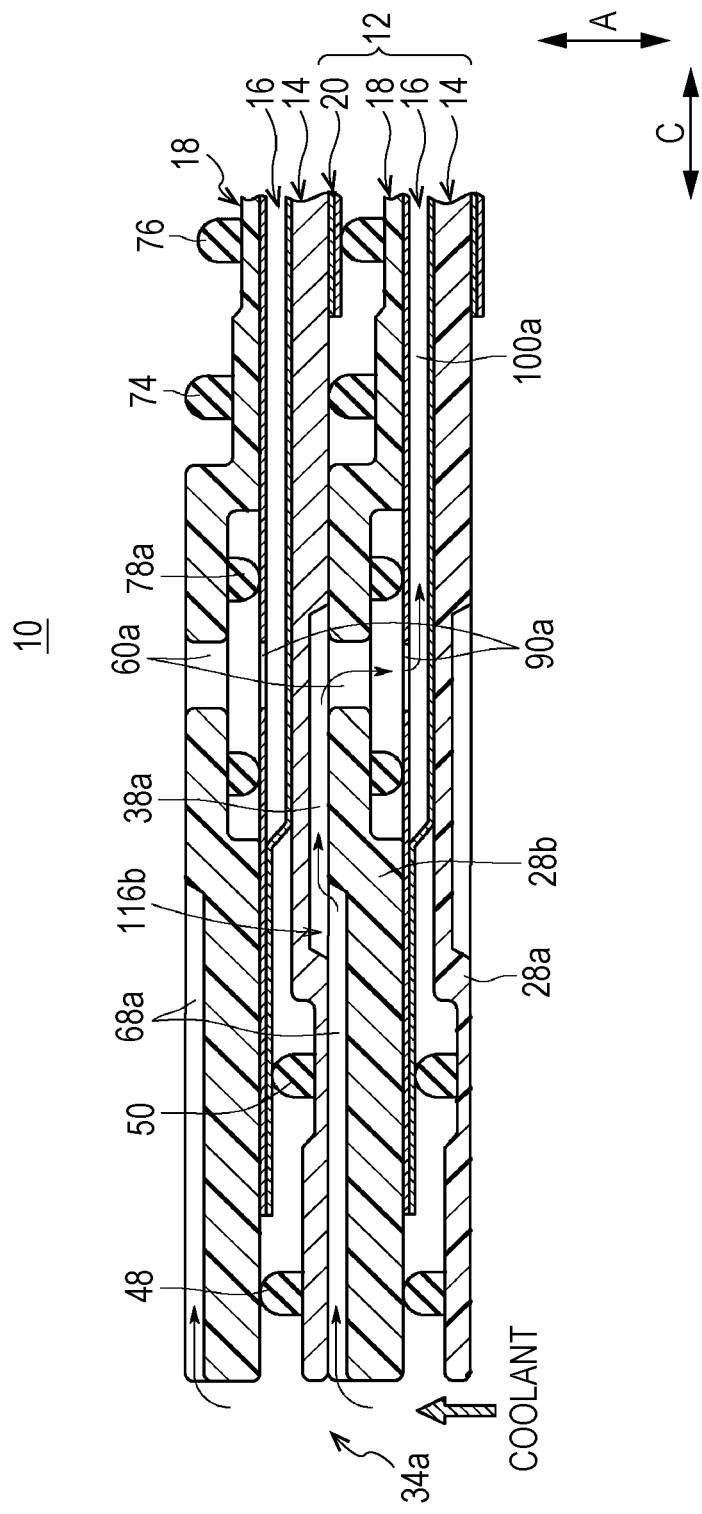

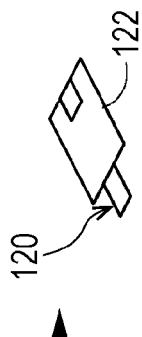
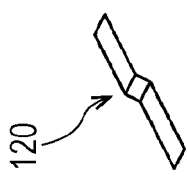
FIG. 15A  FIG. 15B
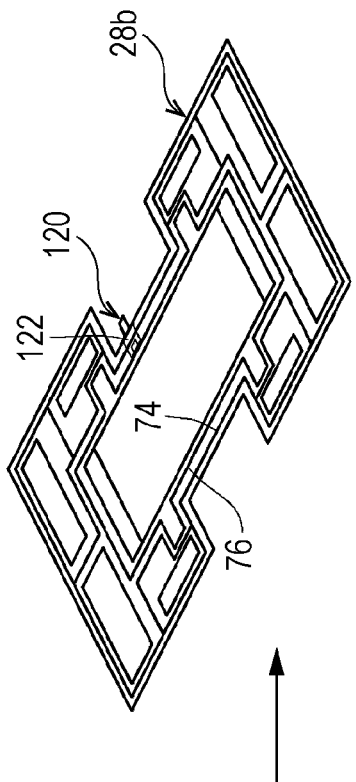
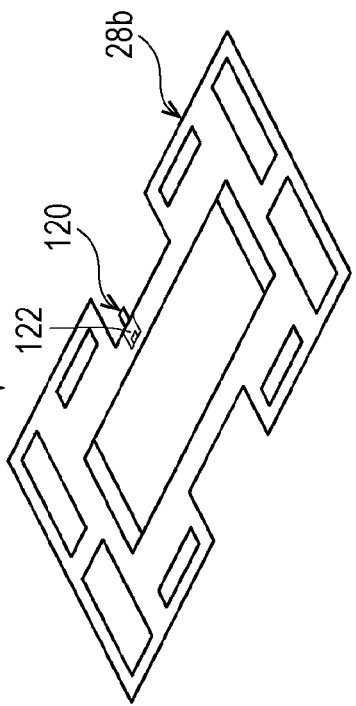
FIG. 15C  FIG. 15D

BACKGROUND ART

FUEL CELL HAVING VOLTAGE MONITOR TERMINAL WITH EXPOSED PORTION

CROSS-REFERENCE TO RELATED APPLICATIONS

The present application claims priority under 35 U.S.C. §119 to Japanese Patent Application No. 2011-096053, filed Apr. 22, 2011, entitled "Fuel Cell." The contents of this application are incorporated herein by reference in their entirety.

BACKGROUND OF THE INVENTION

1. Field of the Invention

The present application relates to a fuel cell.

2. Discussion of the Background

For example, a solid polymer electrolyte fuel cell includes a solid polymer electrolyte membrane that is a solid polymer ion-exchange membrane. A unit cell of such a solid polymer fuel cell includes a membrane electrode assembly (MEA) (electrolyte electrode assembly) and separators (bipolar plates) that sandwich the membrane electrode assembly therebetween. The membrane electrode assembly includes a solid polymer electrolyte membrane and an anode electrode and a cathode electrode disposed on both sides of the solid polymer electrolyte membrane. Each of the anode electrode and the cathode electrodes includes an electrode catalyst layer and a porous carbon. Usually, a predetermined number of such unit cells are stacked to form a fuel cell stack, and the fuel cell stack is used, for example, for an automobile.

In a fuel cell stack of this type, a predetermined number (for example, several tens to several hundreds) of unit cells are stacked to obtain a desired power generation performance. Therefore, it is necessary to detect whether or not each of the unit cells has a desired power generation performance. For this purpose, a voltage detector (cell voltage monitor) is generally connected to a cell voltage monitor terminal of a separator, and the cell voltage of each of the unit cells or each of predetermined unit cells is detected by the voltage detector.

For example, a fuel cell described in Japanese Unexamined Patent Application Publication No. 2008-140722 includes a seal-gasket-integrated MEA 1 illustrated in FIG. 29. The seal-gasket-integrated MEA 1 includes a first MEA 1a and a second MEA 1b, each having a rectangular shape. A seal gasket 2 is disposed around the first and second MEAs 1a and 1b.

A plurality of through-holes 3 for supplying and discharging hydrogen gas, air, and cooling water are formed in the seal gasket 2. The seal gasket 2 is provided with a seal line SL that extends around the first MEA 1a, the second MEA 1b, and the through-holes 3. A cell voltage monitor terminal 4 and a terminal line 5 are embedded in a corner of the seal gasket 2. A part of the cell voltage monitor terminal 4 protrudes from one of the surfaces of the seal gasket 2.

SUMMARY OF THE INVENTION

According to one aspect of the present invention, a fuel cell includes an electrolyte electrode assembly, an inner seal member, an outer seal member, a metal separator, and a cell voltage monitor terminal. The electrolyte electrode assembly includes an electrolyte, a pair of electrodes disposed on both sides of the electrolyte, and a resin frame member integrally provided on an outer periphery of the electrolyte electrode assembly. The inner seal member extends around an electrode surface. The outer seal member extends around an outer periphery of the inner seal member. The inner seal member and the outer seal member are disposed on the resin frame member. The metal separator is stacked with the electrolyte electrode assembly and includes an outer peripheral edge portion disposed between the inner seal member and the outer seal member. The cell voltage monitor terminal is embedded in the resin frame member. The cell voltage monitor terminal includes an exposed portion provided between the inner seal member and the outer seal member. The exposed portion is in contact with the metal separator adjacent to the exposed portion.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 13 is a sectional view of the fuel cell taken along line XIII-XIII of FIG. 1.

FIG. 14 is a sectional view of the fuel cell taken along line XIV-XIV of FIG. 1.

FIGS. 15A to 15D illustrate a process of integrating a cell voltage monitor terminal with a frame portion of the fuel cell.

DESCRIPTION OF THE EMBODIMENTS

Figure 1:
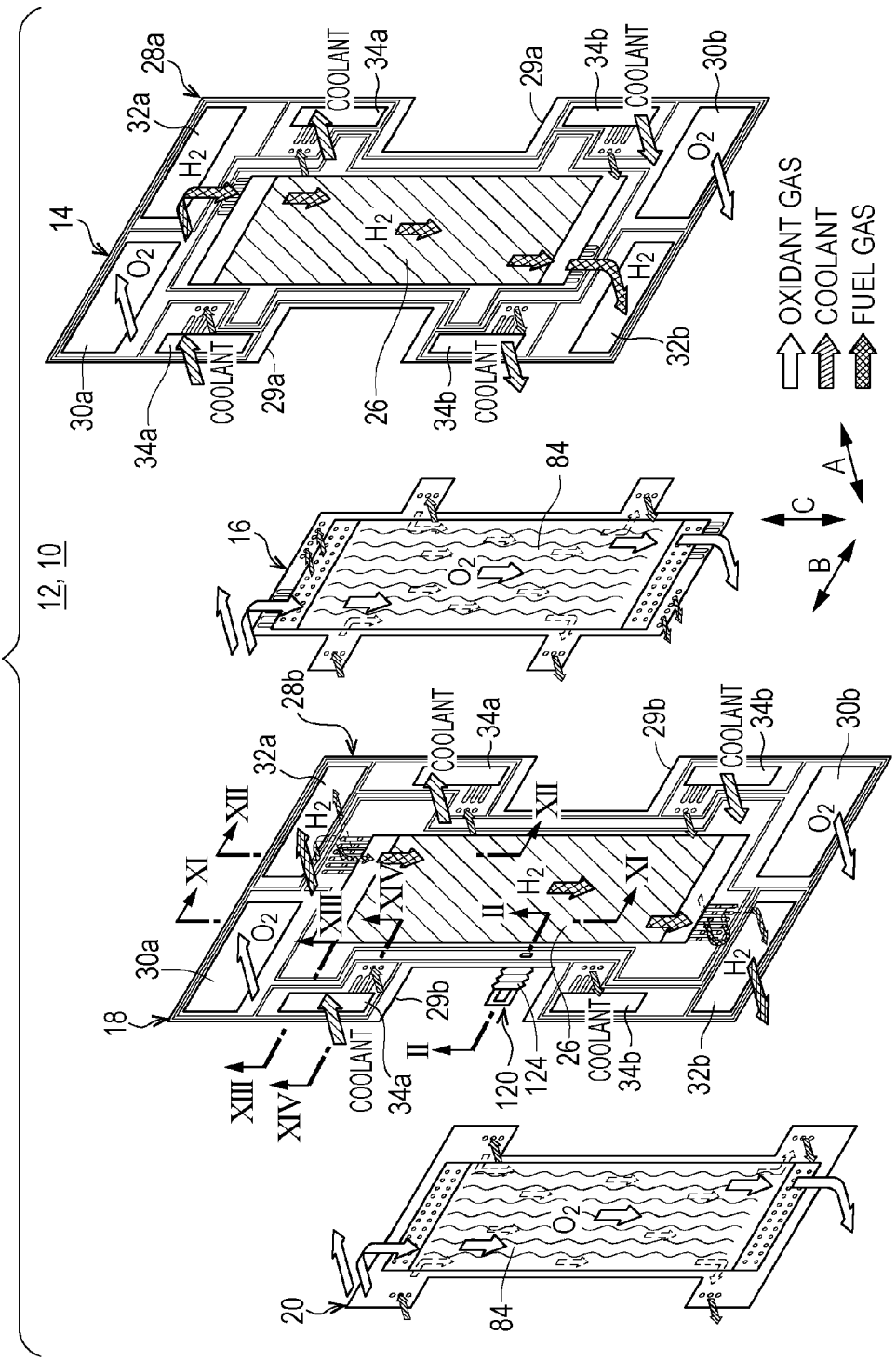
FIG. 1 is an exploded perspective view of a fuel cell according to a first embodiment of the present application.

The embodiments will now be described with reference to the accompanying drawings, wherein like reference numerals designate corresponding or identical elements throughout the various drawings.

Figure 2:
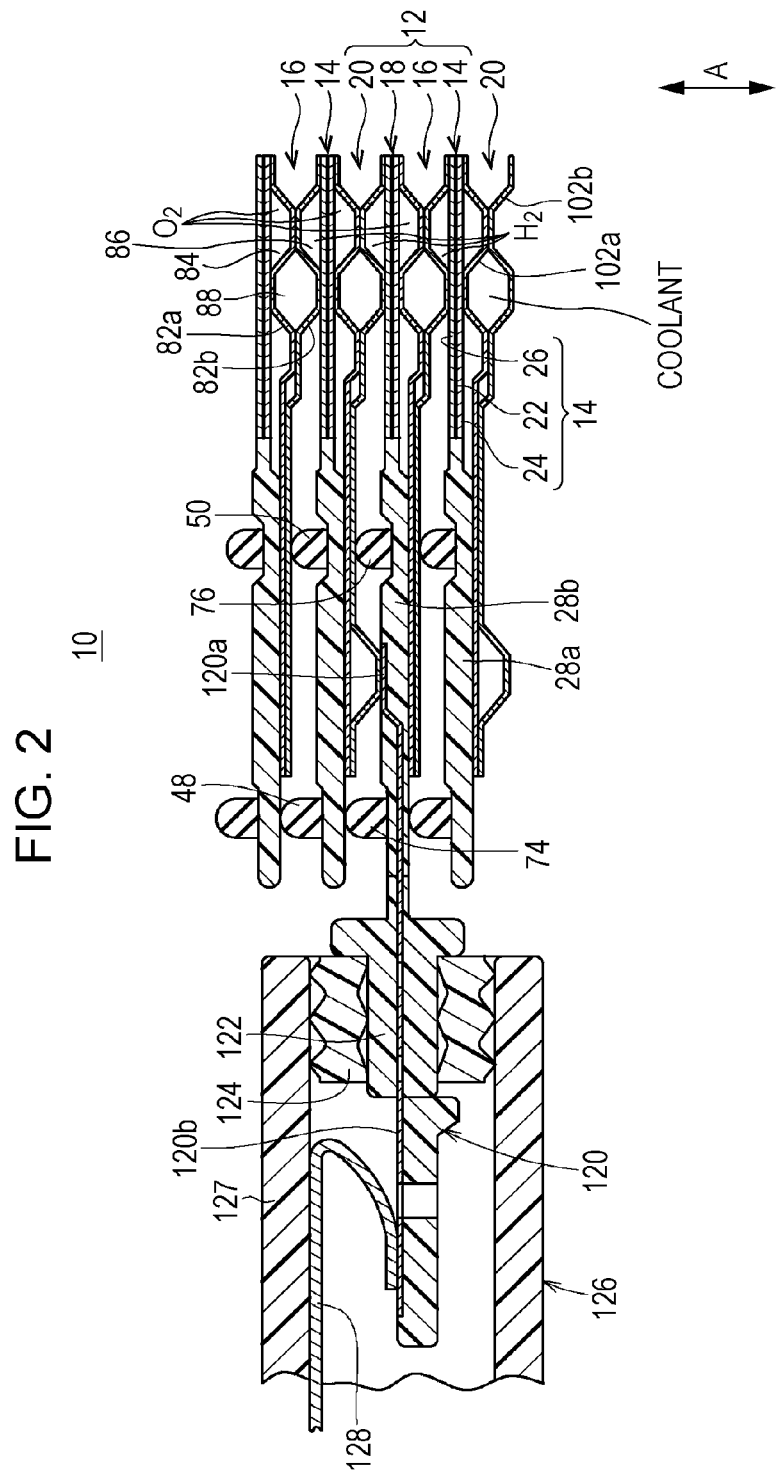
FIG. 2 is a sectional view of the fuel cell taken along line II-II of FIG. 1.

As illustrated in FIGS. 1 and 2, a fuel cell 10 according to a first embodiment of the present application includes a plurality of unit cells 12 that are stacked in the directions of arrows A (horizontal directions).

Each of the unit cells 12 includes a first membrane electrode assembly (MEA) 14 (electrolyte electrode assembly), a first metal separator 16, a second membrane electrode assembly (MEA) 18 (electrolyte electrode assembly), and a second metal separator 20. When the unit cells 12 are stacked, the first membrane electrode assembly 14 is sandwiched between the second and first metal separators 20 and 16, and the second membrane electrode assembly 18 is sandwiched between the first and second metal separators 16 and 20.

The first membrane electrode assembly 14 and the second membrane electrode assembly 18 each include a solid-polymer electrolyte membrane 22 (electrolyte), and a cathode electrode 24 and an anode electrode 26 that sandwich the solid polymer electrolyte membrane 22 therebetween (see FIG. 2). The solid-polymer electrolyte membrane 22 is, for example, a thin film made of a perfluorosulfonate polymer that is impregnated with water.

The solid polymer electrolyte membrane 22 has a surface area the same as those of the cathode electrode 24 and the anode electrode 26. An outer periphery of the solid polymer electrolyte membrane 22 may protrude from edges of the cathode electrode 24 and the anode electrode 26. The surfaces area of the cathode electrode 24 and the surface area of the anode electrode 26 may be different from each other.

A frame portion 28a (resin frame member) is integrally formed on outer peripheral edges of the solid polymer electrolyte membrane 22, the cathode electrode 24, and the anode electrode 26 of the first membrane electrode assembly 14. The frame portion 28a is formed from an insulating polymer material by, for example, injection molding. Likewise, a frame portion 28b (resin frame member) is integrally formed on outer peripheral edges of the solid polymer electrolyte membrane 22, the cathode electrode 24, and the anode electrode 26 of the second membrane electrode assembly 18. The frame portion 28b is formed from a polymer material by, for example, injection molding. General-purpose plastics, engineering plastics, super engineering plastics, and the like may be used as the polymer material.

As illustrated in FIG. 1, each of the frame portions 28a and 28b has a rectangular shape that is elongated in the directions of arrows C. A pair of recesses 29a and a pair of recesses 29b are respectively formed in middle portions of the long sides of the frame portions 28a and 28b by cutting out the middle portions.

The cathode electrode 24 and the anode electrode 26 each include a gas diffusion layer (not shown) and an electrode catalyst layer (not shown). The gas diffusion layer is made of carbon paper or the like. The electrode catalyst layer is made by uniformly coating a surface of the gas diffusion layer with porous carbon particles whose surfaces support a platinum alloy.

As illustrated in FIG. 1, an oxidant gas inlet manifold 30a and a fuel gas inlet manifold 32a are arranged in the directions of arrows B (horizontal directions) in one of end portions (upper end portions) of the frame portions 28a and 28b in the directions of arrows C (vertical directions). An oxidant gas, such as an oxygen-containing gas, is supplied through the oxidant gas inlet manifold 30a. A fuel gas, such as a hydrogen-containing gas, is supplied through the fuel gas inlet manifold 32a.

A fuel gas outlet manifold 32b and an oxidant gas outlet manifold 30b are arranged in the directions of arrows B in the other end portions (lower end portions) of the frame portions 28a and 28b in the directions of arrows C. The fuel gas is discharged through the fuel gas outlet manifold 32b. The oxidant gas is discharged through the oxidant gas outlet manifold 30b.

A pair of coolant inlet manifolds 34a extend, in the directions of arrows A, through upper parts of end portions of the frame portions 28a and 28b in the directions of arrows B. A coolant is supplied through the coolant inlet manifolds 34a. A pair of coolant outlet manifolds 34b extend through parts of end portions of the frame portions 28a and 28b in the directions of arrows B. The coolant is discharged through the coolant outlet manifolds 34b.

A pair of the coolant inlet manifolds 34a are respectively disposed adjacent to the oxidant gas inlet manifold 30a and the fuel gas inlet manifold 32a along both sides of the frame portions 28a and 28b at ends in the directions of arrows B. A pair of the coolant outlet manifolds 34b are respectively disposed adjacent to the oxidant gas outlet manifold 30b and the fuel gas outlet manifold 32b along both sides of the frame portions 28a and 28b at ends in the directions of arrows B. The positions of the coolant inlet manifolds 34a and the coolant outlet manifolds 34b in the up-down direction may be reversed. That is, the coolant inlet manifolds 34a may be disposed adjacent to the oxidant gas outlet manifold 30b and the fuel gas outlet manifold 32b.

In each of the first and second membrane electrode assemblies 14 and 18, the oxidant gas inlet manifold 30a and the fuel gas inlet manifold 32a are disposed near one of the upper and lower short sides, which are a pair of opposite sides, and the oxidant gas outlet manifold 30b and the fuel gas outlet manifold 32b are disposed near the other of the upper and lower short sides. The pair of coolant inlet manifolds 34a and the pair of coolant outlet manifolds 34b are disposed near left and right long sides, which are the remaining pair of opposite sides.

Figure 3:
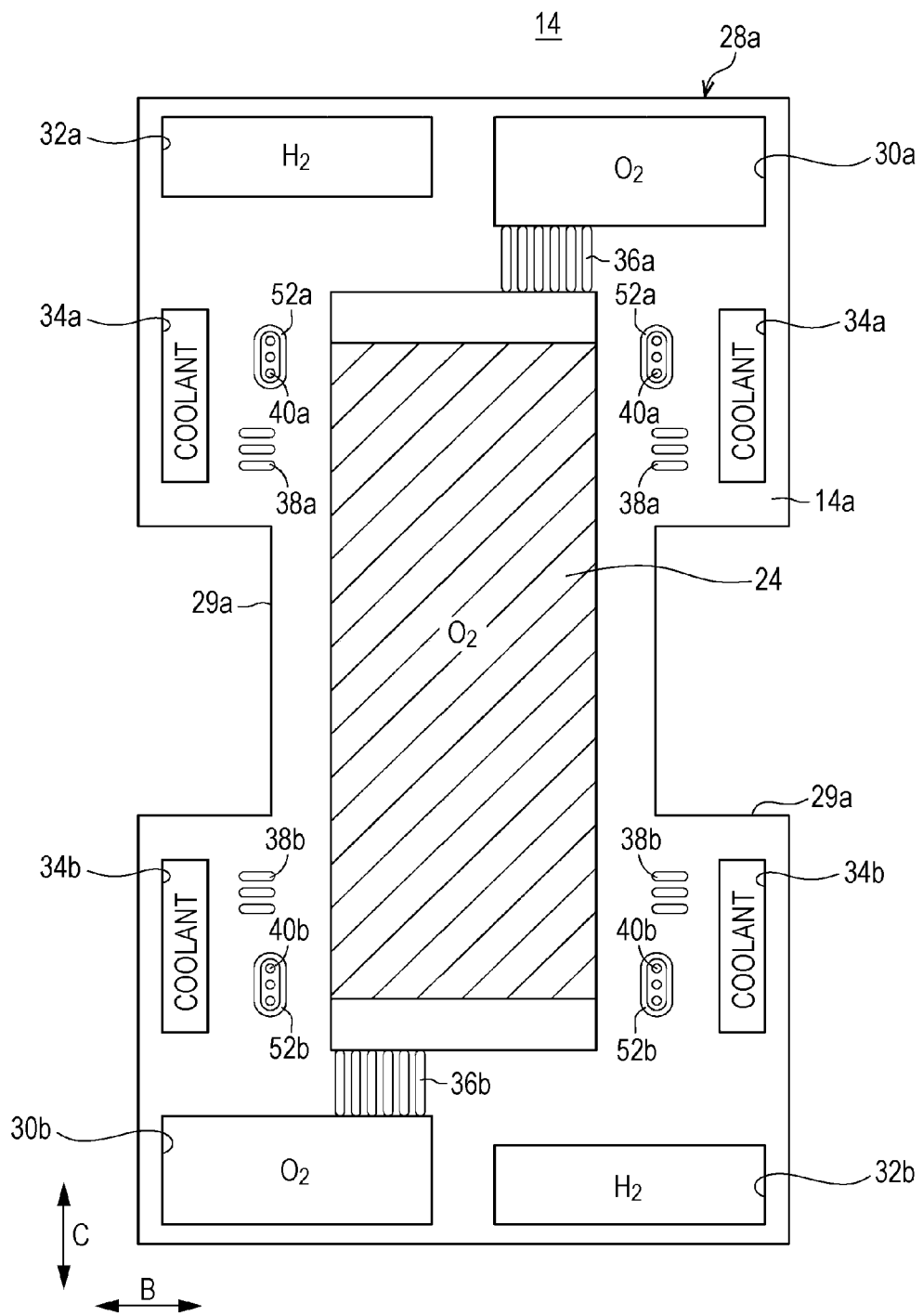
FIG. 3 illustrates a cathode surface of a first membrane electrode assembly of the fuel cell.

As illustrated in FIG. 3, in an upper part of a cathode surface 14a side of the frame portion 28a of the first membrane electrode assembly 14 (on which the cathode electrode 24 is disposed), a plurality of inlet grooves 36a are formed near a lower side of the oxidant gas inlet manifold 30a. In an upper part of each of end portions, in the width directions (the directions of arrows B), of the cathode surface 14a side of the frame portion 28a, a plurality of inlet grooves 38a are formed near a lower part of a corresponding one of the coolant inlet manifolds 34a. A plurality of inlet holes 40a extend through a part of the frame portion 28a near an upper part of the coolant inlet manifold 34a.

In a lower part of the cathode surface 14a side of the frame portion 28a, a plurality of outlet grooves 36b are formed near an upper side of the oxidant gas outlet manifold 30b. In a lower part of each of end portions, in the width direction, of the cathode surface 14a side of the frame portion 28a, a plurality of outlet grooves 38b are formed near an upper part of a corresponding one of the coolant outlet manifolds 34b. A plurality of outlet holes 40b extend through a part of the frame portion 28a near a lower part of the coolant outlet manifold 34b.

Figure 4:
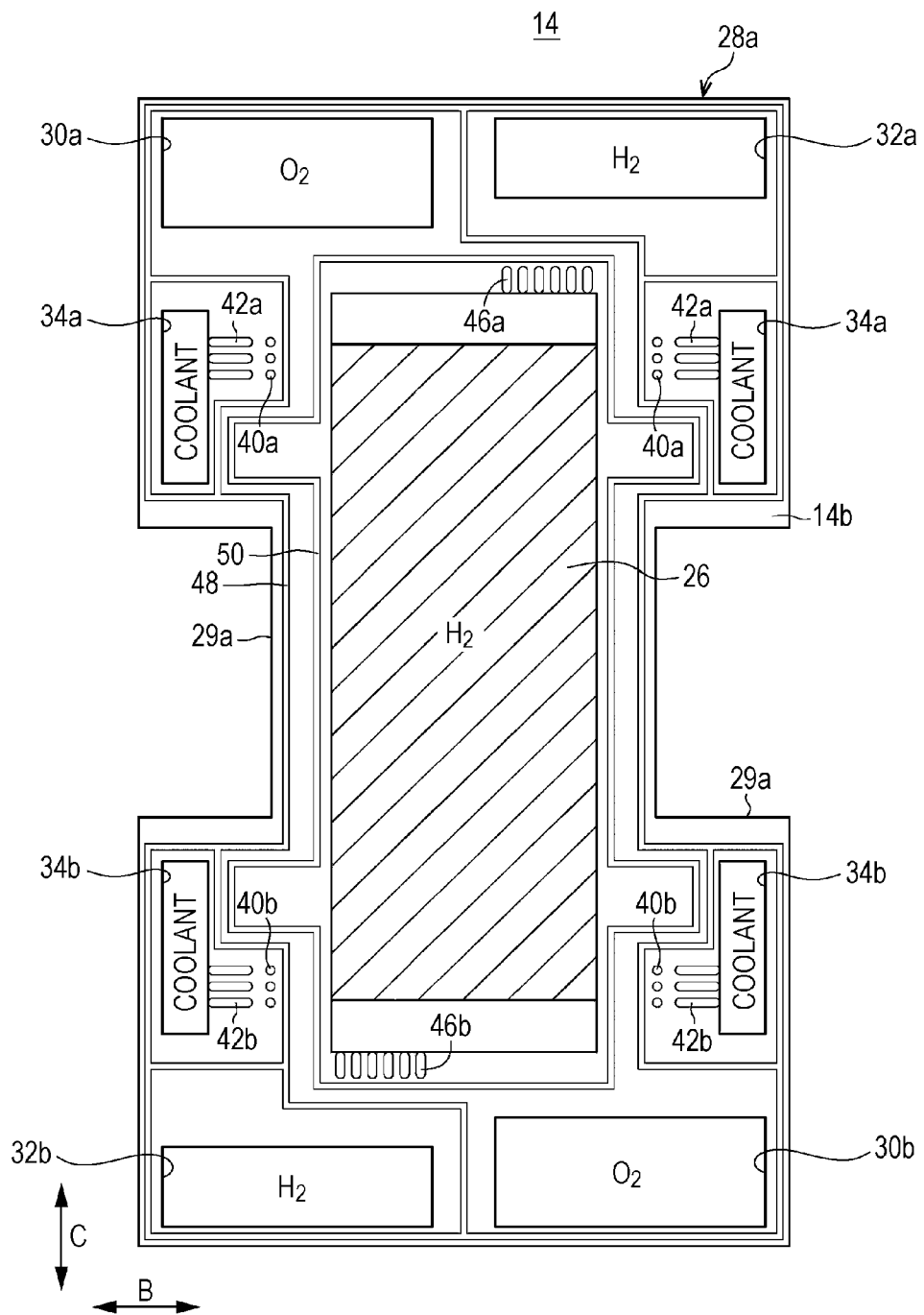
FIG. 4 illustrates an anode surface of the first membrane electrode assembly.

As illustrated in FIG. 4, in an upper part of each of end portions, in the width direction, of an anode surface 14b side of the frame portion 28a of the first membrane electrode assembly 14 (on which the anode electrode 26 is disposed), a plurality of inlet grooves 42a are formed near an upper part of a corresponding one of the coolant inlet manifolds 34a. In a lower part of each of end portions, in the width direction, of the anode surface 14b side of the frame portion 28a, a plurality of outlet grooves 42b are formed near a lower part of a corresponding one of the coolant outlet manifolds 34b.

A plurality of inlet grooves 46a are formed in a part of the frame portion 28a below the fuel gas inlet manifold 32a and a plurality of outlet grooves 46b are formed in a part of the frame portion 28a above the fuel gas outlet manifold 32b.

An outer seal member 48 (outer seal line) and an inner seal member 50 (inner seal line) are integrally or independently formed on the anode surface 14b side of the frame portion 28a. The outer seal member 48 and the inner seal member 50 are made from a sealing material, a cushioning material, or a packing material. Examples of such materials include EPDM, NBR, fluorocarbon rubber, silicone rubber, fluorosilicone rubber, butyl rubber, natural rubber, styrene rubber, chloroprene-rubber, and acrylic rubber. Other seal members described below are similar to the outer seal member 48 and the inner seal member 50, and detailed description thereof will be omitted.

The outer seal member 48 extends around the outer periphery of the frame portion 28a and the outer peripheries of all manifolds, i.e., the oxidant gas inlet manifold 30a, the coolant inlet manifolds 34a, the fuel gas inlet manifold 32a, the oxidant gas outlet manifold 30b, the coolant outlet manifolds 34b, and the fuel gas outlet manifold 32b. The outer seal member 48 also extends around the outer periphery of a reaction surface (power generation surface). The outer seal member 48 surrounds the coolant inlet manifold 34a, the fuel gas inlet manifold 32a, the coolant outlet manifold 34b, and the fuel gas outlet manifold 32b. The outer seal member 48 integrally surrounds the inlet grooves 42a, the inlet holes 40a, and the coolant inlet manifolds 34a; and integrally surrounds the outlet grooves 42b, the outlet holes 40b, and the coolant outlet manifolds 34b.

The inner seal member 50 is disposed inside of the outer seal member 48 and integrally surrounds the anode electrode 26, the inlet grooves 46a, and the outlet grooves 46b. The inner seal member 50 extends along an outline that corresponds to the shape of the first metal separator 16 and is contact with the entire outer periphery of a surface of the first metal separator 16 (inside of the surface of the separator). The outer seal member 48 is disposed outside of the outer periphery of the first metal separator 16 (outside of the surface of the separator). The all manifolds are surrounded by and sealed with the outer seal member 48 and the inner seal member 50.

As illustrated in FIG. 3, ring-shaped inlet seal members 52a that surround the inlet holes 40a and ring-shaped outlet seal members 52b that surround the outlet holes 40b are disposed on the cathode surface 14a side of the frame portion 28a.

Figure 5:
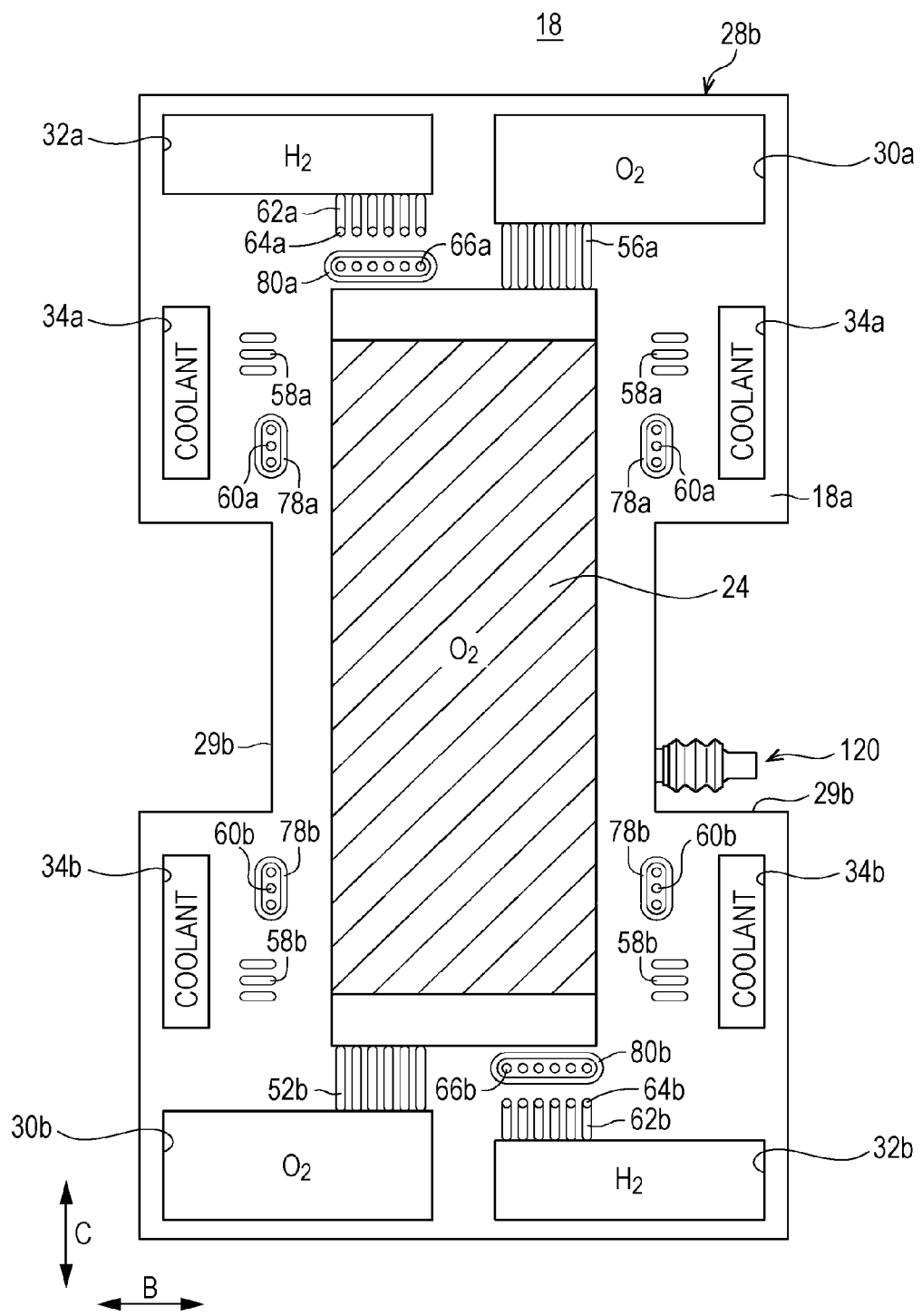
FIG. 5 illustrates a cathode surface of a second membrane electrode assembly of the fuel cell.

As illustrated in FIG. 5, in an upper part of a cathode surface 18a side of the frame portion 28b of the second membrane electrode assembly 18 (on which the cathode electrode 24 is disposed), a plurality of inlet grooves 56a are formed near a lower side of the oxidant gas inlet manifold 30a.

In an upper part of each of end portions, in the width directions (the directions of arrows B), of the cathode surface 18a side of the frame portion 28b, a plurality of inlet grooves 58a are formed near an upper part of corresponding one of the coolant inlet manifolds 34a. A plurality of inlet holes 60a are formed near a lower part of the coolant inlet manifold 34a. The inlet holes 60a of the second membrane electrode assembly 18 are disposed at positions that are offset so that the inlet holes 60a do not overlap the inlet holes 40a of the first membrane electrode assembly 14 in the stacking direction.

In an upper part of the cathode surface 18a side of the frame portion 28b, a plurality of inlet grooves 62a are formed near a lower side of the fuel gas inlet manifold 32a. A plurality of inlet holes 64a are formed at lower ends of the inlet grooves 62a so as to extend through the frame portion 28b. A plurality of inlet holes 66a, which are arranged at a predetermined pitch, extend through a part of the frame portion 28b below the inlet holes 64a.

In a lower part of each of end portions, in the width direction, of the cathode surface 18a side of the frame portion 28b, a plurality of outlet grooves 58b are formed near a lower part of a corresponding one of the coolant outlet manifolds 34b. A plurality of outlet holes 60b extend through a part of the frame portion 28b near an upper part of the coolant outlet manifold 34b. The outlet holes 60b of the second membrane electrode assembly 18 are disposed at positions that are offset so that the outlet holes 60b do not overlap the outlet holes 40b of the first membrane electrode assembly 14 in the stacking direction.

In a lower part of the cathode surface 18a side of the frame portion 28b, a plurality of outlet grooves 62b are formed near an upper side of the fuel gas outlet manifold 32b. A plurality of outlet holes 64b are formed at upper ends of the outlet grooves 62b so as to extend through the frame portion 28b. A plurality of outlet holes 66b, which are arranged at a predetermined pitch, extend through a part of the frame portion 28b above the outlet holes 64b.

Figure 6:
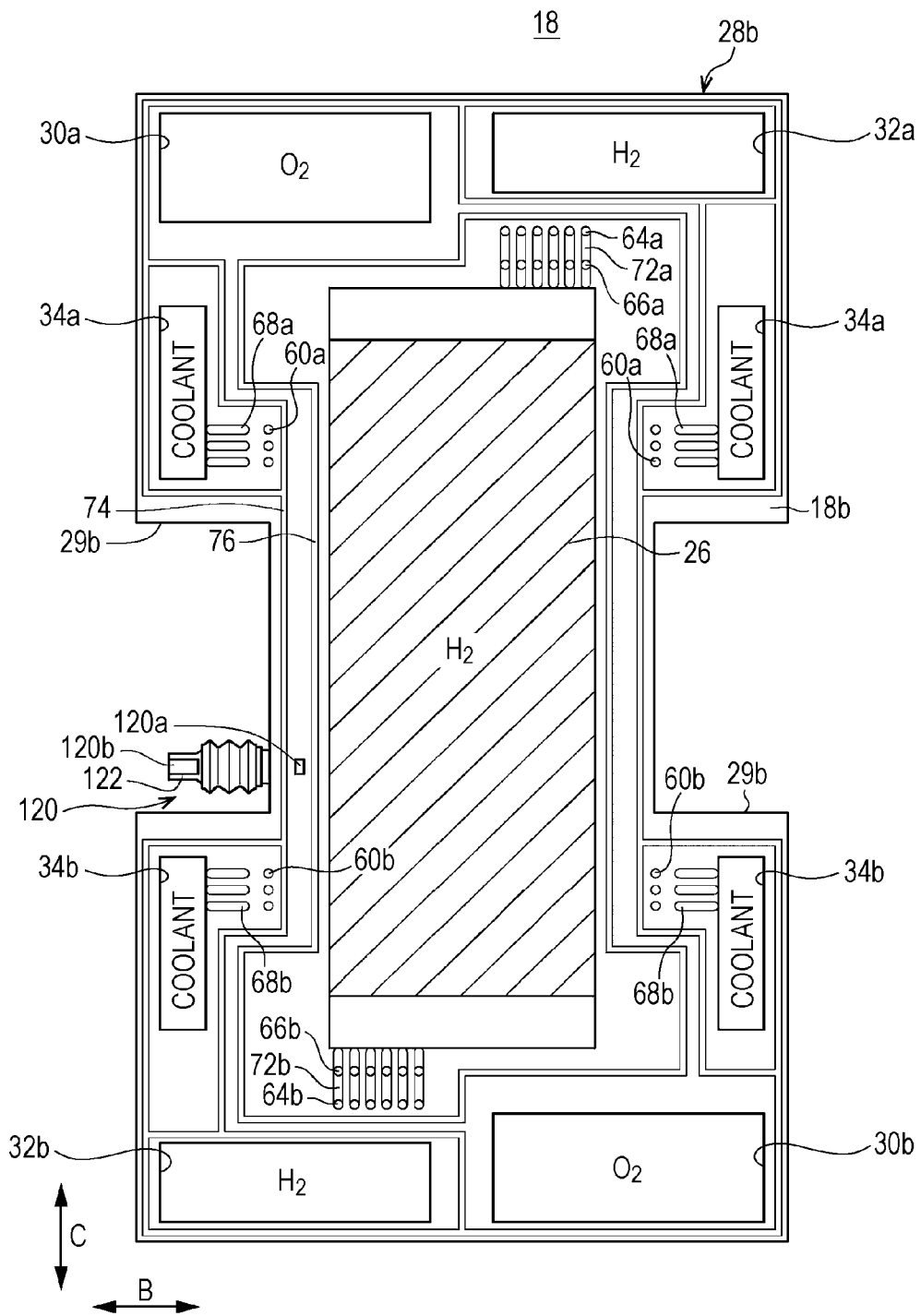
FIG. 6 illustrates an anode surface of the second membrane electrode assembly.

As illustrated in FIG. 6, in an upper part of each of end portions of an anode surface 18b side of the frame portion 28b of the second membrane electrode assembly 18 (on which the anode electrode 26 is disposed), a plurality of inlet grooves 68a are formed near a lower part of a corresponding one of the coolant inlet manifolds 34a. A plurality of inlet grooves 72a for connecting the inlet holes 64a and 66a to each other are formed in a part of the frame portion 28b below the fuel gas inlet manifold 32a.

In a lower part of each of end portions, in the width direction, of the anode surface 18b side of the frame portion 28b, a plurality of outlet grooves 68b are formed near an upper part of a corresponding one of the coolant outlet manifolds 34b. A plurality of outlet grooves 72b for connecting the outlet holes 64b and 66b to each other are formed in a part of the frame portion 28b above the fuel gas outlet manifold 32b.

An outer seal member 74 (outer seal line) and an inner seal member 76 (inner seal line) are integrally or independently formed on the anode surface 18b side of the frame portion 28b. The outer seal member 74 extends around the outer periphery of the frame portion 28b and the outer peripheries of all manifolds, i.e., the oxidant gas inlet manifold 30a, the coolant inlet manifolds 34a, the fuel gas inlet manifold 32a, the oxidant gas outlet manifold 30b, the coolant outlet manifolds 34b, and the fuel gas outlet manifold 32b.

The outer seal member 74 surrounds the coolant inlet manifolds 34a, the fuel gas inlet manifold 32a, the coolant outlet manifolds 34b, and the fuel gas outlet manifold 32b. The outer seal member 74 integrally surrounds the inlet grooves 68a, the inlet holes 60a, and the coolant inlet manifolds 34a; and integrally surrounds the outlet grooves 68b, the outlet holes 60b, and the coolant outlet manifolds 34b.

The inner seal member 76 is disposed inside of the outer seal member 74 and integrally surrounds the anode electrode 26, the inlet holes 64a and 66a, the inlet grooves 72a, the outlet holes 64b and 66b, and the outlet grooves 72b. The inner seal member 76 extends along an outline that corresponds to the shape of the second metal separator 20 and is contact with the entire outer periphery of a surface of the second metal separator 20. The outer seal member 74 is disposed outside of the outer periphery of the second metal separator 20. The all manifolds are surrounded by and sealed with the outer seal member 74 and the inner seal member 76.

As illustrated in FIG. 5, ring-shaped inlet seal members 78a that surround the inlet holes 60a, a ring-shaped inlet seal member 80a that surrounds the inlet holes 66a, ring-shaped outlet seal members 78b that surround the outlet holes 60b, and a ring-shaped outlet seal member 80b that surrounds the outlet holes 66b are disposed on the cathode surface 18a side of the frame portion 28b.

The sizes of the first and second metal separators 16 and 20 are determined so that the first and second metal separators 16 and 20 are disposed inward from the oxidant gas inlet manifold 30a, the coolant inlet manifolds 34a, the fuel gas inlet manifold 32a, the oxidant gas outlet manifold 30b, the coolant outlet manifolds 34b, and the fuel gas outlet manifold 32b (all manifolds).

As illustrated in FIG. 2, the first metal separator 16 includes two metal plates 82a and 82b (for example, stainless-steel plates) that have the same size and that are stacked. Outer peripheral edge portions of the metal plates 82a and 82b are integrated with each other by, for example, welding or bonding; and the space between the metal plates 82a and 82b is sealed. An oxidant gas channel 84 is formed on a surface of the metal plate 82a facing the cathode electrode 24. A fuel gas channel 86 is formed on a surface of the metal plate 82b facing the anode electrode 26. A coolant channel 88 is formed between the metal plates 82a and 82b.

Figure 7:
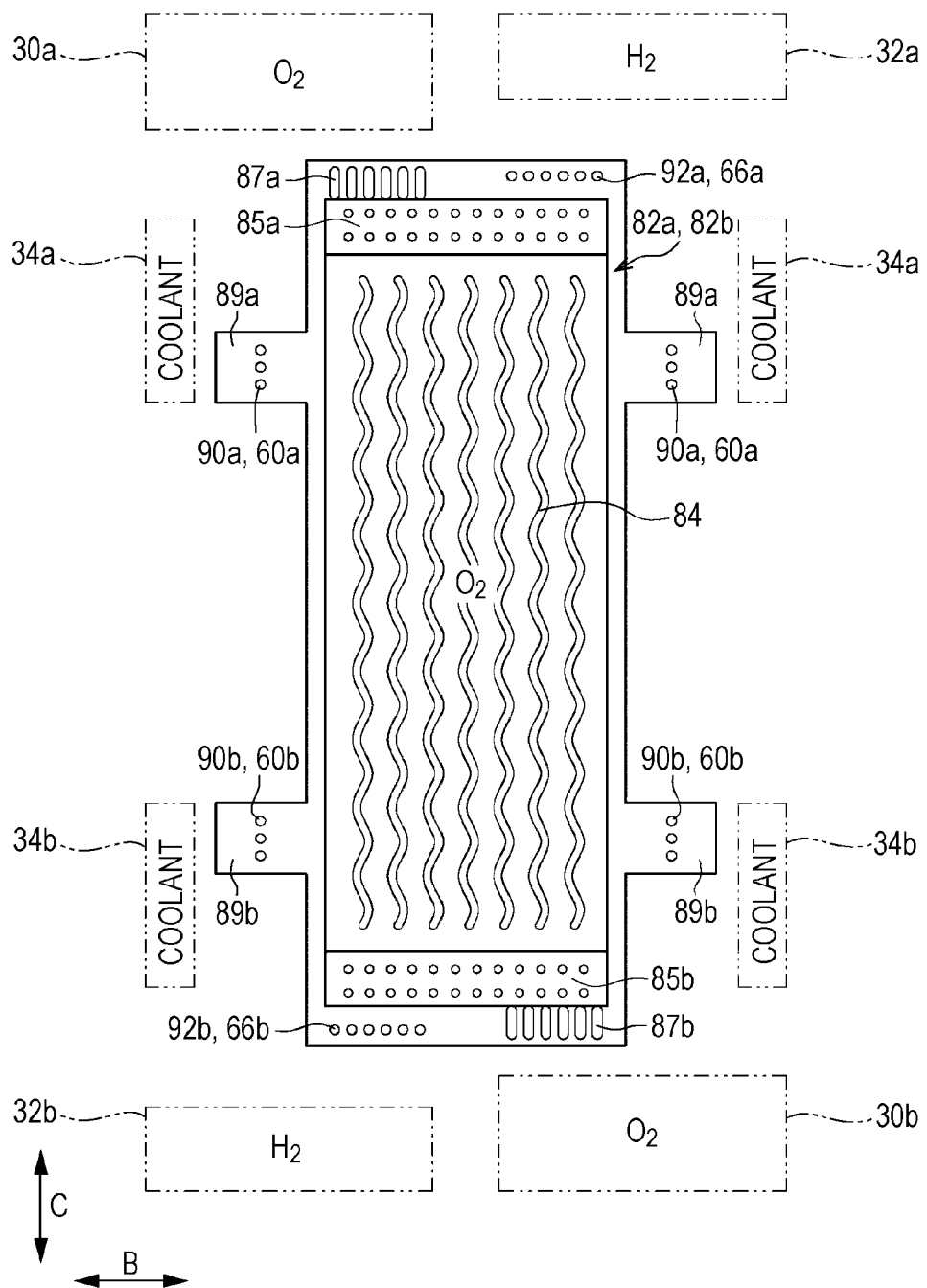
FIG. 7 illustrates a cathode surface of a first metal separator of the fuel cell.

As illustrated in FIG. 7, in the first metal separator 16, the oxidant gas channel 84 is formed along a surface of the metal plate 82a. The oxidant gas channel 84 includes a plurality of wave-shaped channel grooves that extend in the directions of arrows C (vertical directions). An inlet buffer portion 85a and an outlet buffer portion 85b are respectively disposed upstream and downstream of the oxidant gas channel 84. A plurality of inlet grooves 87a are formed in a part of the metal plate 82a above the inlet buffer portion 85a and below the oxidant gas inlet manifold 30a. A plurality of outlet grooves 87b are formed in a part of the metal plate 82a below the outlet buffer portion 85b and above the oxidant gas outlet manifold 30b.

The first metal separator 16 has a rectangular shape that is elongated in the directions of arrows C. The first metal separator 16 includes a pair of protrusions 89a and a pair of protrusions 89b. The pair of protrusions 89a protrude from both ends, in transverse directions (the directions of arrows B), of the first metal separator 16 toward lower parts of the coolant inlet manifolds 34a. The pair of protrusions 89b protrude from both ends, in the transverse directions, of the first metal separator 16 toward upper parts of the coolant outlet manifolds 34b. A plurality of holes 90a, which are connected to the plurality of inlet holes 60a of the second membrane electrode assembly 18, are formed in each of the protrusions 89a of the metal plate 82a. A plurality of holes 90b, which are connected to the plurality of outlet holes 60b of the second membrane electrode assembly 18, are formed in each of the protrusions 89b of the metal plate 82a.

A plurality of holes 92a, which are connected to the inlet holes 66a of the second membrane electrode assembly 18, are formed in an upper part of the metal plate 82a. A plurality of holes 92b, which are connected to the outlet holes 66b of the second membrane electrode assembly 18, are formed in a lower part of the metal plate 82a. The holes 92a and 92b are also formed in the metal plate 82b and extend through the first metal separator 16.

Figure 8:
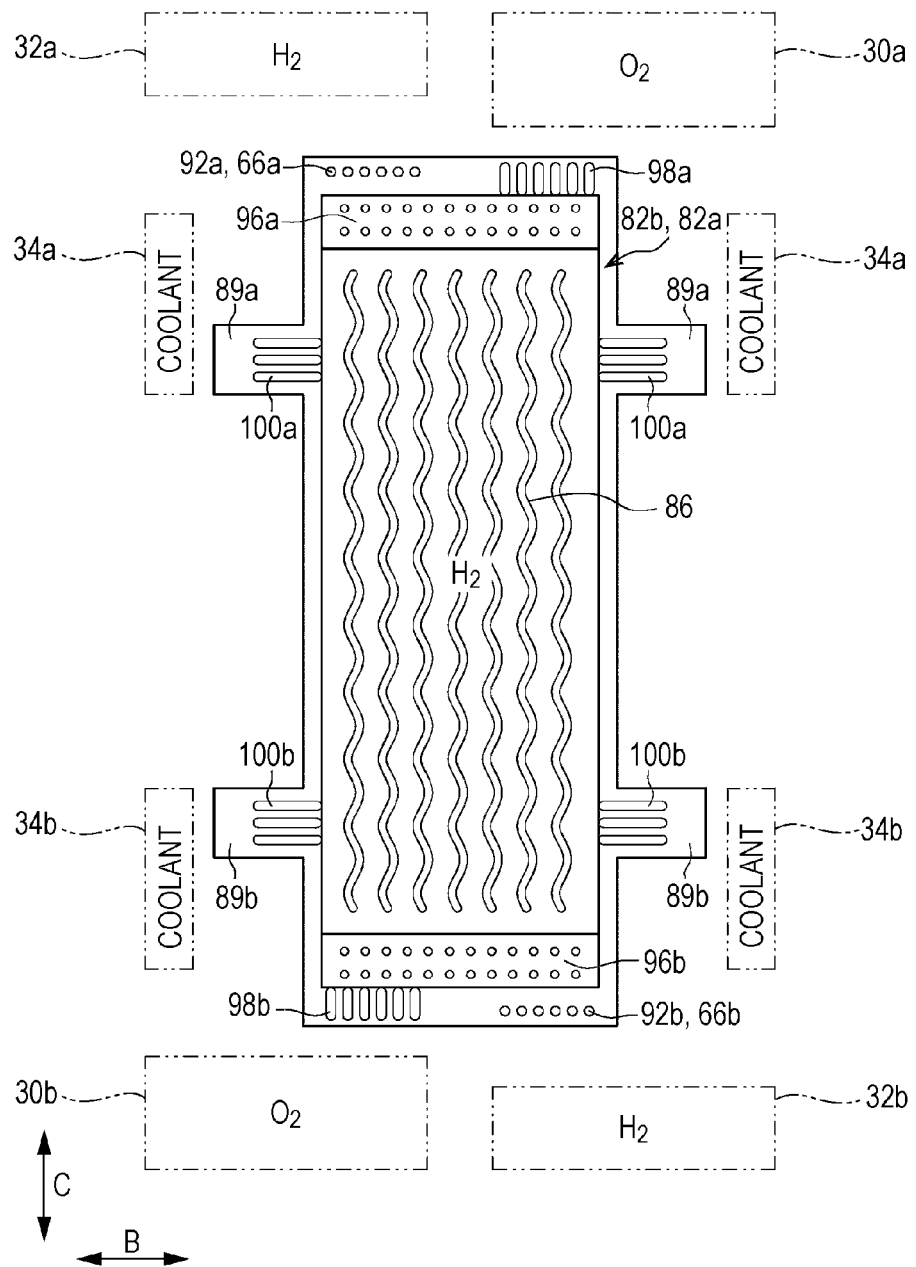
FIG. 8 illustrates an anode surface of the first metal separator.

As illustrated in FIG. 8, in the first metal separator 16, the fuel gas channel 86 is formed along a surface of the metal plate 82b. The fuel gas channel 86 includes a plurality of wave-shaped channel grooves that extend in the directions of arrows C (vertical directions). An inlet buffer portion 96a and an outlet buffer portion 96b are respectively disposed upstream and downstream of the fuel gas channel 86. A plurality of inlet grooves 98a are formed in a part of the metal plate 82b above the inlet buffer portion 96a and below the oxidant gas inlet manifold 30a. A plurality of outlet grooves 98b are formed in a part of the metal plate 82b below the outlet buffer portion 96b and above the oxidant gas outlet manifold 30b.

In each of the protrusions 89a of the metal plate 82b, a plurality of inlet grooves 100a are formed near a lower part of a corresponding one of the coolant inlet manifolds 34a. In each of the protrusions 89b of the metal plate 82b, a plurality of outlet grooves 100b are formed near an upper part of a corresponding one of the coolant outlet manifolds 34b.

As illustrated in FIG. 2, the second metal separator 20 includes two metal plates 102a and 102b (for example, stainless-steel plates) that have the same size and that are stacked. Outer peripheral edge portions of the metal plates 102a and 102b are integrated with each other by, for example, welding or bonding; and the space between the metal plates 102a and 102b is sealed. The oxidant gas channel 84 is formed on a surface of the metal plate 102a facing the cathode electrode 24. The fuel gas channel 86 is formed on a surface of the metal plate 102b facing the anode electrode 26. The coolant channel 88 is formed between the metal plates 102a and 102b.

Figure 9:
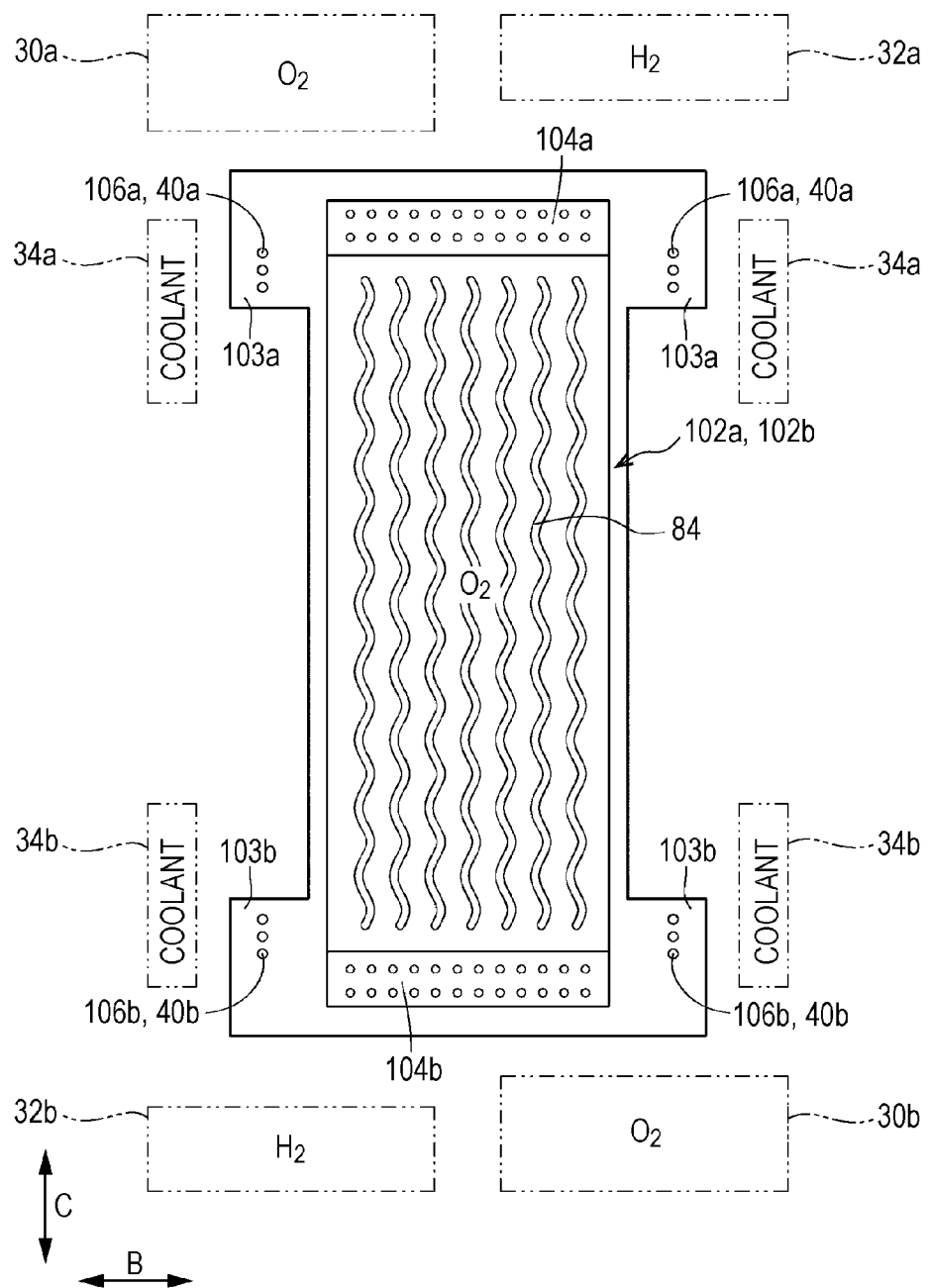
FIG. 9 illustrates a cathode surface of a second metal separator of the fuel cell.

As illustrated in FIG. 9, the second metal separator 20 includes a pair of protrusions 103a and a pair of protrusions 103b on both sides thereof in the directions of arrows C. The protrusions 103a and 103b protrude outward in the directions of arrows B. The oxidant gas channel 84 is formed along a surface of the metal plate 102a. The oxidant gas channel 84 includes a plurality of wave-shaped channel grooves that extend in the directions of arrows C (vertical directions). An inlet buffer portion 104a and an outlet buffer portion 104b are respectively disposed upstream and downstream of the oxidant gas channel 84.

In each of the protrusions 103a of the metal plate 102a, a plurality of holes 106a are formed near an upper part of a corresponding one of the coolant inlet manifolds 34a. The plurality of holes 106a are connected to the plurality of inlet holes 40a of the first membrane electrode assembly 14. In each of the protrusions 103b of the metal plate 102a, a plurality of holes 106b are formed near a lower part of a corresponding one of the coolant outlet manifolds 34b. The plurality of holes 106b are connected to the plurality of outlet holes 40b of the first membrane electrode assembly 14.

Figure 10:
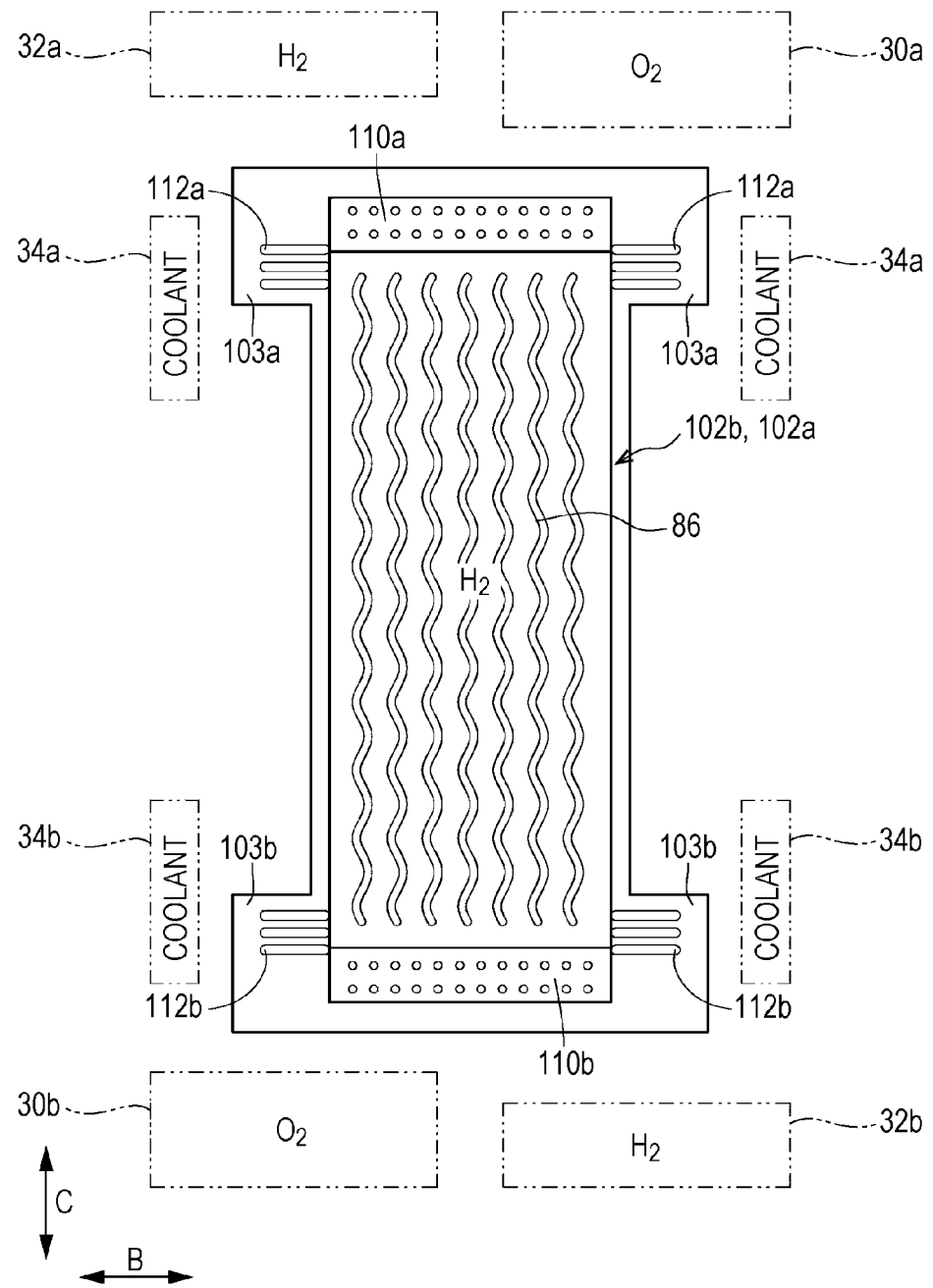
FIG. 10 illustrates an anode surface of the second metal separator.

As illustrated in FIG. 10, in the second metal separator 20, the fuel gas channel 86 is formed along a surface of the metal plate 102b. The fuel gas channel 86 includes a plurality of wave-shaped channel grooves that extend in the directions of arrows C (vertical directions). An inlet buffer portion 110a and an outlet buffer portion 110b are respectively disposed upstream and downstream of the fuel gas channel 86.

In each of the protrusions 103a of the metal plate 102b, a plurality of inlet grooves 112a are formed near an upper part of a corresponding one of the coolant inlet manifolds 34a. In each of the protrusions 103b of the metal plate 102b, a plurality of outlet grooves 112b are formed near a lower part of a corresponding one of the coolant outlet manifolds 34b. The inlet grooves 112a and the outlet grooves 112b each have a concave-convex structure for forming a coolant channel in the second metal separator 20.

Figure 11:
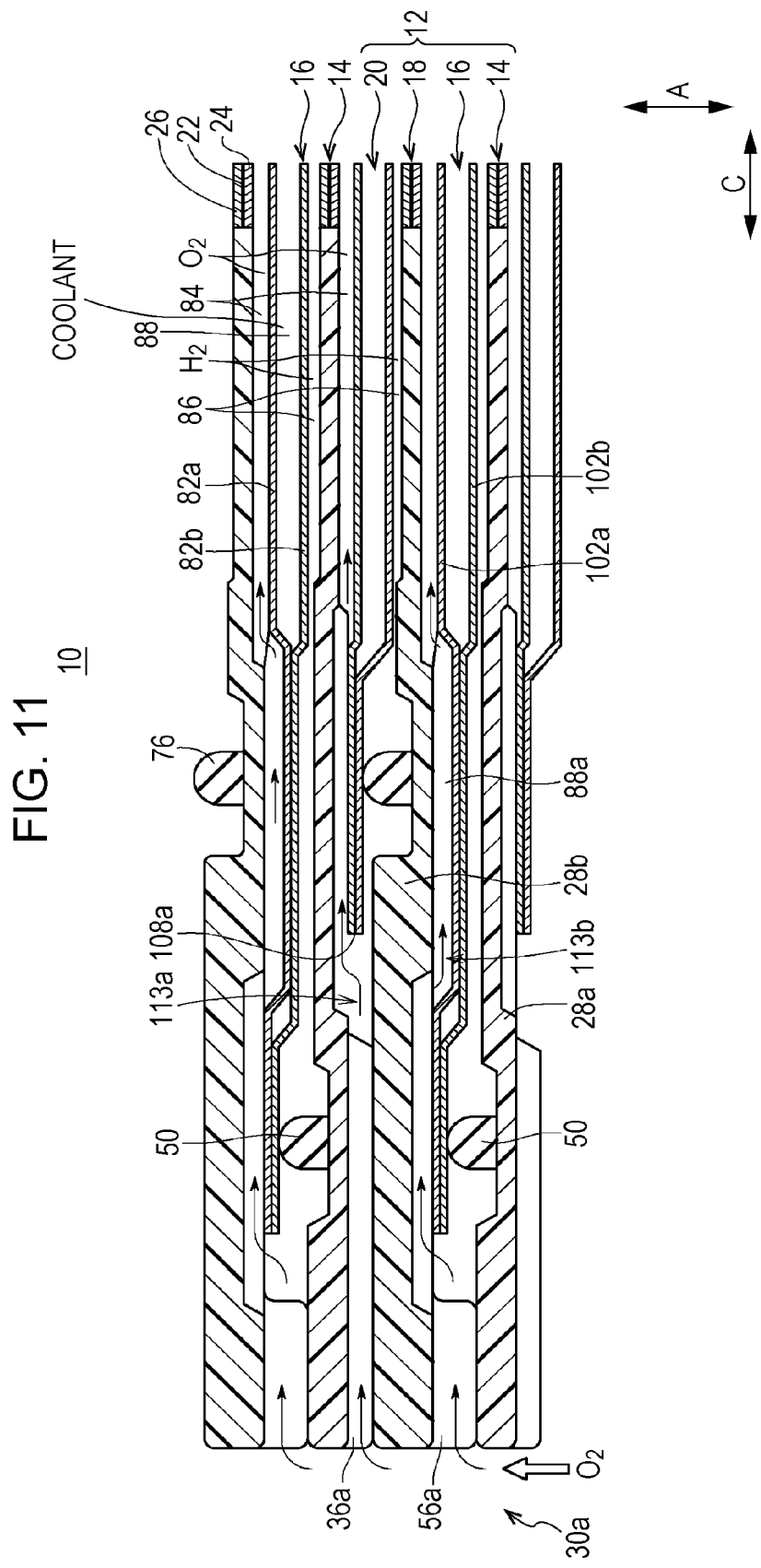
FIG. 11 is a sectional view of the fuel cell taken along line XI-XI of FIG. 1.

As illustrated in FIG. 11, an oxidant gas connection channel 113a and an oxidant gas connection channel 113b are formed between the frame portions 28a and 28b that are disposed adjacent to each other in the stacking direction. The oxidant gas connection channel 113a connects the oxidant gas inlet manifold 30a to the oxidant gas channel 84 of the second membrane electrode assembly 18. The oxidant gas connection channel 113b connects the oxidant gas inlet manifold 30a to the oxidant gas channel 84 of the first membrane electrode assembly 14. Another oxidant gas connection channel (not shown), which connects the oxidant gas outlet manifold 30b to the oxidant gas channel 84, is formed between the frame portions 28a and 28b.

Figure 12:
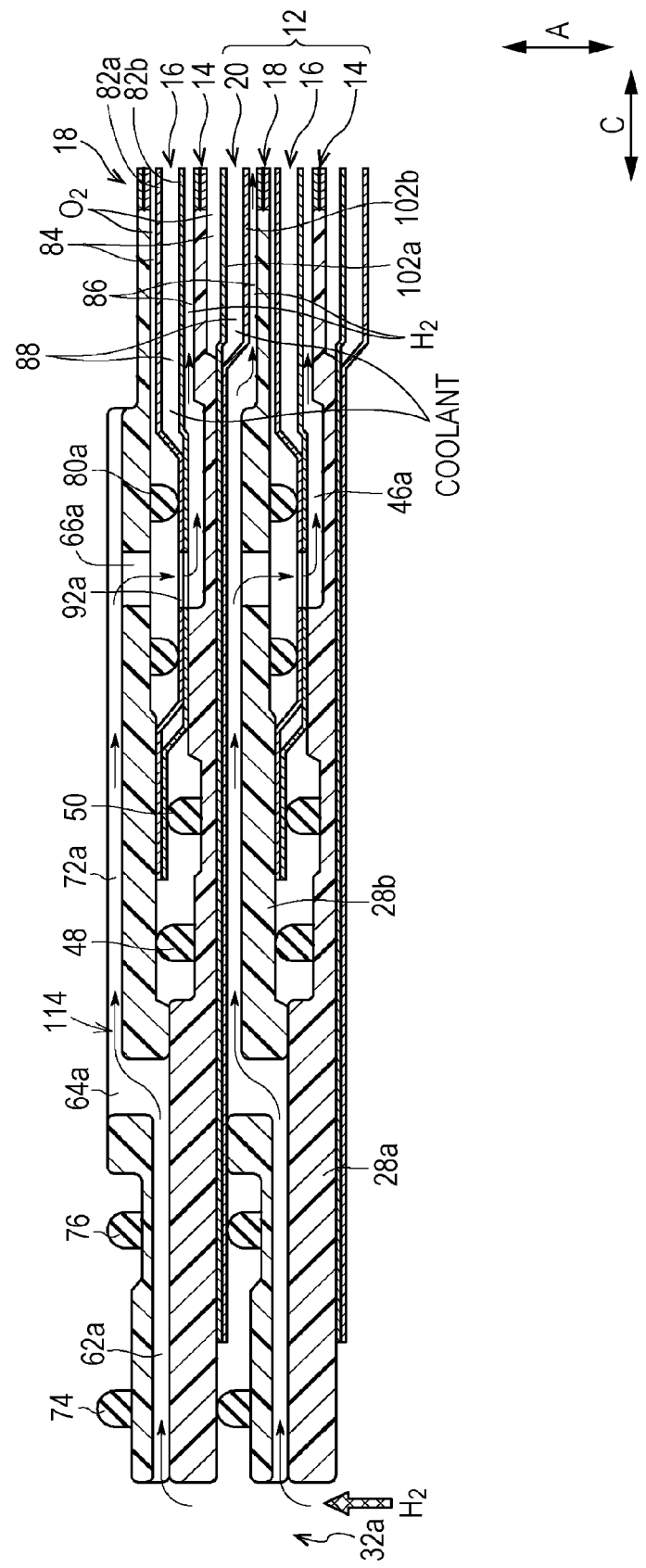
FIG. 12 is a sectional view of the fuel cell taken along line XII-XII of FIG. 1.

As illustrated in FIG. 12, a fuel gas connection channel 114 is formed between the frame portions 28a and 28b that are disposed adjacent to each other in the stacking direction. The fuel gas connection channel 114 connects the fuel gas inlet manifold 32a to the fuel gas channel 86. Another fuel gas connection channel (not shown), which connects the fuel gas outlet manifold 32b to the fuel gas channel 86, is formed between the frame portions 28a and 28b.

As illustrated in FIGS. 13 and 14, a coolant connection channel 116a and a coolant connection channel 116b are formed between the frame portions 28a and 28b that are disposed adjacent to each other in the stacking direction. The coolant connection channel 116a connects the coolant inlet manifold 34a to the coolant channel 88 of the second metal separator 20. The coolant connection channel 116b connects the coolant inlet manifold 34a to the coolant channel 88 of the first metal separator 16. Another coolant connection channel (not shown), which connects the coolant outlet manifold 34b to the coolant channel 88, is formed between the frame portions 28a and 28b.

The coolant connection channels 116a and 116b are formed because the outer seal member 48 and the inner seal member 50 of the frame portion 28a and the outer seal member 74 and the inner seal member 76 of the frame portion 28b are disposed at different positions in the stacking direction.

As illustrated in FIG. 13, the coolant connection channel 116a includes the inlet grooves 42a and 58a, the inlet holes 40a (first holes), and the holes 106a (second holes). The inlet grooves 42a and 58a extend in the in-plane direction of the separator. The inlet holes 40a extend through the frame portion 28a in the stacking direction. The holes 106a extend through the metal plate 102a of the second metal separator 20 in the stacking direction. An end of each of the inlet grooves 42a is connected to an end of a corresponding one of the inlet grooves 58a.

As illustrated in FIG. 14, the coolant connection channel 116b includes inlet grooves 68a and 38a, the inlet holes 60a (first holes), and the holes 90a (second holes). The inlet grooves 68a and 38a extend in the in-plane direction of the separator. The inlet holes 60a extend through the frame portions 28b in the stacking direction. The holes 90a extend through the metal plate 82a of the first metal separator 16 in the stacking direction. An end of each of the inlet grooves 68a is connected to an end of a corresponding one of the inlet grooves 38a.

The inlet holes 40a of the frame portion 28a and holes 106a are disposed at positions at which they do not overlap the inlet holes 60a of the frame portion 28b and the holes 90a in the stacking direction.

As illustrated in FIGS. 1, 2, 5 and 6, a cell voltage monitor terminal 120 is embedded in the frame portion 28b of the second membrane electrode assembly 18 at a position corresponding to one of the recesses 29b. Alternatively, the cell voltage monitor terminal 120 may be embedded in the frame portion 28a of the first membrane electrode assembly 14.

As illustrated in FIG. 2, an outer peripheral edge portion of the first metal separator 16 is disposed between the inner seal member 50 and the outer seal member 48 of the first membrane electrode assembly 14. An outer peripheral edge portion of the second metal separator 20 is disposed between the inner seal member 76 and the outer seal member 74 of the second membrane electrode assembly 18.

The cell voltage monitor terminal 120 includes an exposed portion 120a between the inner seal member 76 and the outer seal member 74. The exposed portion 120a is in contact with an adjacent second metal separator 20. It is preferable that parts of the cell voltage monitor terminal 120 other than the exposed portion 120a be embedded in the frame portion 28b. In this case, the sealability is improved because the cell voltage monitor terminal 120 does not cross the outer seal. The same applies to a second embodiment described below.

By turning the cell voltage monitor terminal 120 upside down in FIG. 2, the exposed portion 120a can be exposed to a space between the inner seal member 50 and the outer seal member 48 and can be made to come into contact with an adjacent first metal separators 16.

The cell voltage monitor terminal 120 is integrally provided with a resin member 122 that protrudes outward from an outer periphery of the frame portion 28b. The resin member 122 is integrated with the cell voltage monitor terminal 120 when the frame portion 28b is molded (as described below). An exposed end portion 120b, which is exposed to the outside, is disposed at the distal end of the cell voltage monitor terminal 120.

A seal member 124 is fitted onto a distal end portion of the cell voltage monitor terminal 120. A connector 126 can be connected to and disconnected from the distal end portion. The connector 126 includes a U-shaped connection terminal portion 128 disposed in a casing 127. The connection terminal portion 128 is in electrical contact with the exposed end portion 120b and is connected to a cell voltage measuring apparatus (not shown).

Next, a process of integrating the cell voltage monitor terminal 120 with the frame portion 28b will be described below.

First, as illustrated in FIG. 15A, the cell voltage monitor terminal 120 is prepared. The cell voltage monitor terminal 120 has been formed by bending a flat metal plate into a predetermined shape. As illustrated in FIG. 15B, the cell voltage monitor terminal 120 is insert molded with the resin member 122 (first molding).

Figure 16:
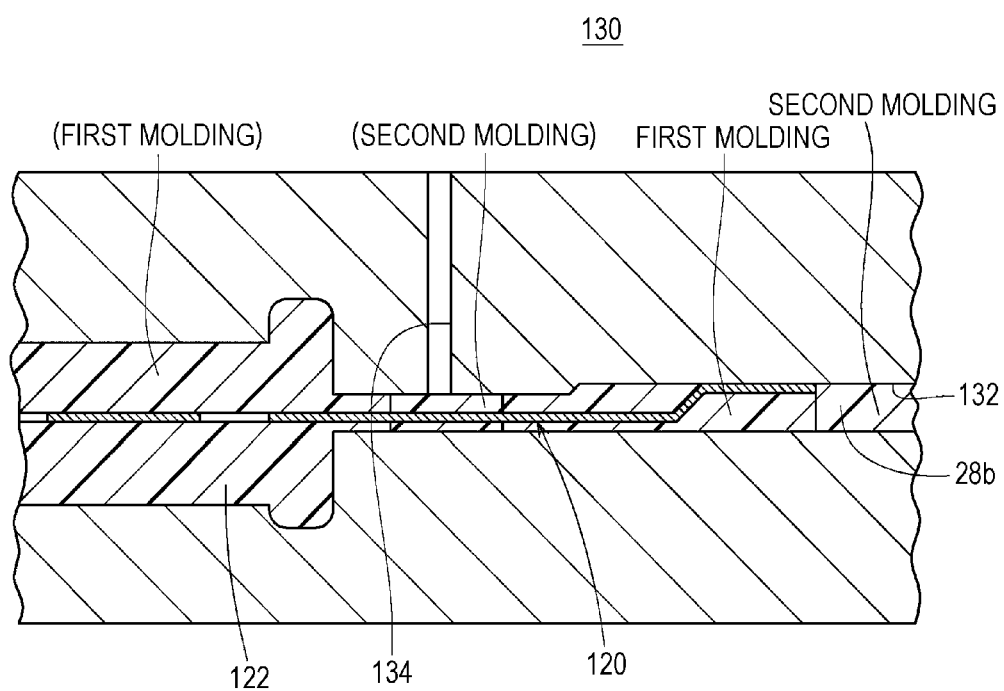
FIG. 16 is a sectional view of an injection molding device used in the integration process.

As illustrated in FIG. 15C, the cell voltage monitor terminal 120 and the resin member 122 are integrally insert molded with the frame portion 28b (second molding). To be specific, an injection molding device 130 is used as illustrated in FIG. 16. The injection molding device 130 for molding the frame portion 28b has a cavity 132 corresponding to the shape of the frame portion 28b.

The cell voltage monitor terminal 120 and the resin member 122, which have been integrated with each other, are placed in the cavity 132. By injecting a melted resin into the cavity 132 through a gate 134 while the injection molding device 130 is clamped, the frame portion 28b having the cell voltage monitor terminal 120 embedded therein and integrated with the resin member 122 is molded.

As illustrated in FIG. 15D, the outer seal member 74 and the inner seal member 76 are integrally molded on the anode surface 18b side of the frame portion 28b (third molding). The second membrane electrode assembly 18 is made by forming the frame portion 28b on the outer peripheries of the solid polymer electrolyte membrane 22, the cathode electrode 24, and the anode electrode 26.

The operation of the fuel cell 10 will be described below.

As illustrated in FIG. 1, an oxidant gas, such as an oxygen-containing gas, is supplied to the oxidant gas inlet manifold 30a. A fuel gas, such as a hydrogen-containing gas, is supplied to the fuel gas inlet manifold 32a. A coolant, such as pure water, ethylene glycol, or the like, is supplied to the pair of coolant inlet manifolds 34a.

As illustrated in FIGS. 1 and 11, in each of the unit cells 12, the oxidant gas, which has been supplied to the oxidant gas inlet manifold 30a, is introduced to the inlet grooves 36a of the first membrane electrode assembly 14 and to the inlet grooves 56a of the second membrane electrode assembly 18.

The oxidant gas that has been introduced to the inlet grooves 36a is supplied to the oxidant gas channel 84 of the second metal separator 20. The oxidant gas, which has been supplied to the oxidant gas channel 84, is supplied to the cathode electrode 24 of the first membrane electrode assembly 14. Exhausted oxidant gas is discharged through the outlet grooves 36b to the oxidant gas outlet manifold 30b.

The oxidant gas that has been introduced to the inlet grooves 56a passes through the inlet grooves 87a between the second membrane electrode assembly 18 and the first metal separator 16 and is supplied to the oxidant gas channel 84 of the first metal separator 16. The oxidant gas, which has been supplied to the oxidant gas channel 84, is supplied to the cathode electrode 24 of the second membrane electrode assembly 18. Exhausted oxidant gas is discharged to the oxidant gas outlet manifold 30b through the outlet grooves 87b and 56b.

As illustrated in FIGS. 1 and 12, the fuel gas that has been supplied to the fuel gas inlet manifold 32a is introduced to the inlet grooves 62a on the cathode side of the second membrane electrode assembly 18. The fuel gas flows to the anode side through the inlet grooves 62a and the inlet holes 64a, and a part of the fuel gas is supplied to the fuel gas channel 86 of the second metal separator 20 through the inlet grooves 72a.

The remaining part of the fuel gas passes through the inlet holes 66a and the holes 92a of the first metal separator 16 and is introduced to a space between the first metal separator 16 and the first membrane electrode assembly 14. Then, the fuel gas is supplied to the fuel gas channel 86 of the first metal separator 16.

Exhausted fuel gas that has flowed through the fuel gas channel 86 of the second metal separator 20 is discharged to the outlet grooves 72b. Then, the exhausted fuel gas passes through the outlet holes 64b and the outlet grooves 62b and is discharged to the fuel gas outlet manifold 32b. Exhausted fuel gas that has flowed through the fuel gas channel 86 of the first metal separator 16 passes through the holes 92b and the outlet holes 66b and is discharged to the outlet grooves 72b. Then, the exhausted fuel gas is likewise discharged to the fuel gas outlet manifold 32b.

Thus, the oxidant gas and the fuel gas, which are respectively supplied to the cathode electrode 24 and the anode electrode 26, are consumed in electrochemical reactions in the electrode catalyst layers of the first membrane electrode assembly 14 and the second membrane electrode assembly 18, thereby generating electric power.

Moreover, as illustrated in FIGS. 1 and 13, a part of the coolant that has been supplied to a respective one of the pair of coolant inlet manifolds 34a is introduced to the inlet grooves 42a of the first membrane electrode assembly 14 and supplied through the inlet grooves 58a to the inlet holes 40a. The coolant passes through the inlet holes 40a and the holes 106a of the second metal separator 20 and is introduced into the second metal separator 20.

Parts of the coolant flow in the second metal separator 20 along the inlet grooves 112a so as to become closer to each other in the directions of arrows B and are supplied to the coolant channel 88. The parts of the coolant, which have flowed so as to become closer to each other, collide with each other in a middle part of the coolant channel 88 in the directions of arrows B, flow in the direction of gravity (downward in the directions of arrows C), and then bifurcate in both directions of arrows B in a lower part of the coolant channel 88. Then, the coolant passes through the pair of outlet grooves 112b and the holes 106b and is discharged from the second metal separator 20. Subsequently, the coolant passes through the outlet holes 40b and the outlet grooves 58b and 42b and is discharged to the coolant outlet manifold 34b.

As illustrated in FIGS. 1 and 14, another part of the coolant that have been supplied to respective one of the coolant inlet manifolds 34a is introduced to the inlet grooves 68a of the second membrane electrode assembly 18 and supplied through the inlet grooves 38a to the inlet holes 60a. The coolant pass through the inlet holes 60a and the holes 90a of the first metal separator 16 and are introduced into the first metal separator 16.

The parts of the coolant flow in the first metal separator 16 along the inlet grooves 100a so as to become closer to each other in the directions of arrows B and are supplied to the coolant channel 88. The parts of the coolant flow in the direction of gravity (downward in the directions of arrows C) along the coolant channel 88, and then bifurcate in both directions of arrows B. Then, the coolant passes through the outlet grooves 100b and the holes 90b and is discharged from the first metal separator 16. Subsequently, the coolant passes through the outlet holes 60b and the outlet grooves 38b and 68b and is discharged to the coolant outlet manifold 34b.

Thus, the first membrane electrode assembly 14 and the second membrane electrode assembly 18 are cooled by the coolant, which flows through the coolant channel 88 in the first metal separator 16 and the coolant channel 88 in the second metal separator 20.

In the first embodiment, as illustrated in FIGS. 2, 5 and 6, the cell voltage monitor terminal 120, which is embedded in the frame portion 28b, includes the exposed portion 120a, which is exposed between the inner seal member 76 and the outer seal member 74, and the exposed portion 120a is in contact with the second metal separator 20. Therefore, the cell voltage monitor terminal 120 extends to the outside of the frame portion 28b without crossing the seal line, and thereby desired sealability can be obtained.

Moreover, as compared with a structure in which a cell voltage monitor terminal extends directly from the second metal separator 20, the size of the second metal separator 20 can be appropriately reduced and thereby reduction in the weight and the cost of the second metal separator 20 can be easily achieved. Thus, an advantage is gained in that the entirety of the fuel cell 10 can be economically obtained.

Figure 17:
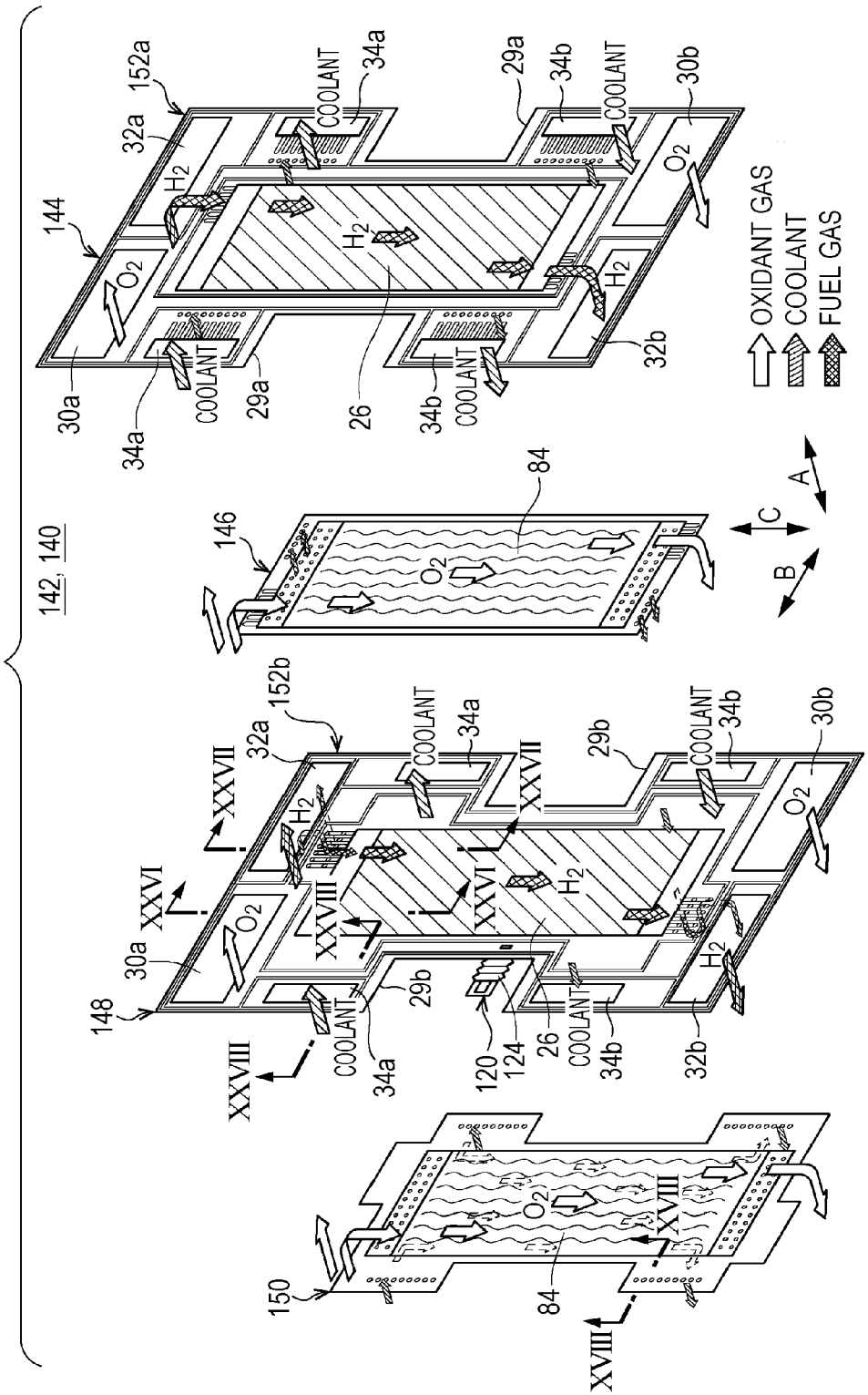
FIG. 17 is an exploded perspective view of a fuel cell according to a second embodiment of the present application.

FIG. 17 is an exploded perspective view of a fuel cell 140 according to a second embodiment of the present application. The components of the fuel cell 140 the same as those of the fuel cell 10 according to the first embodiment are denoted by the same numerals and detailed description thereof will be omitted.

Figure 18:
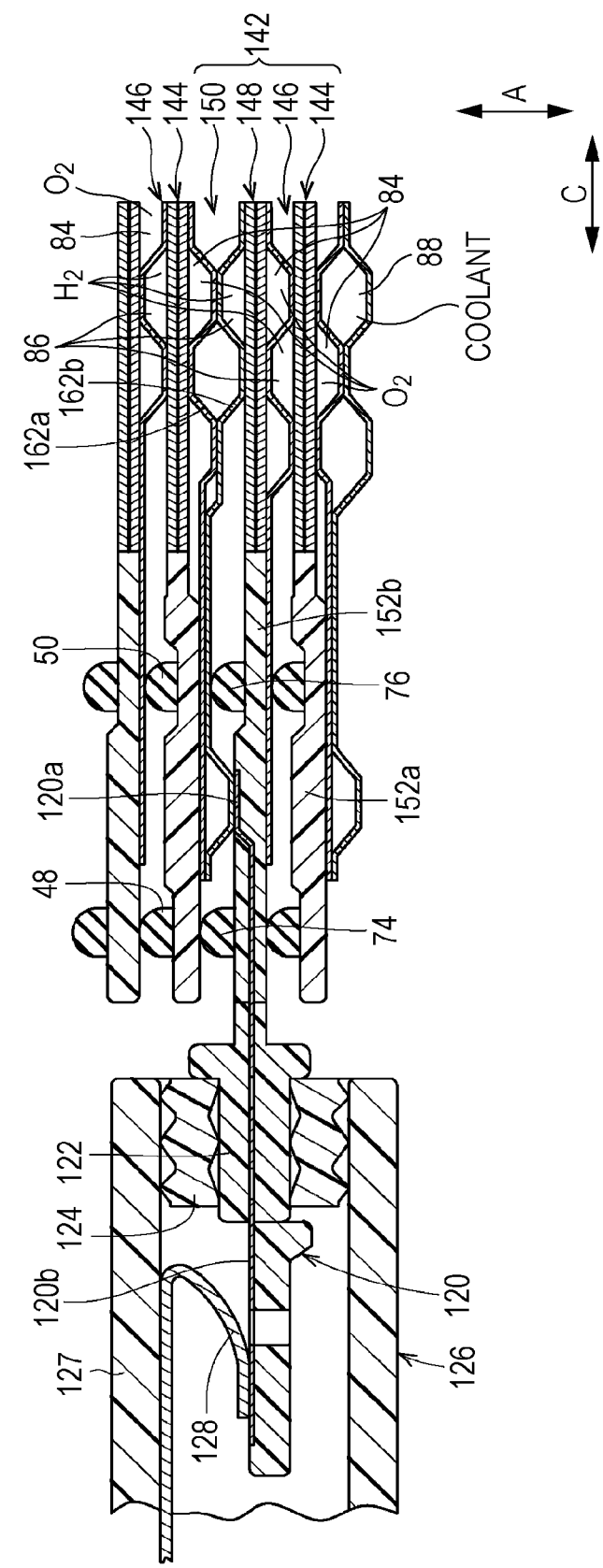
FIG. 18 is a sectional view of the fuel cell taken along line XVIII-XVIII of FIG. 17.

As illustrated in FIGS. 17 and 18, the fuel cell 140 includes a plurality of unit cells 142 that are stacked. Each of the unit cells 142 includes a first membrane electrode assembly (MEA) 144 (electrolyte electrode assembly), a first metal separator 146, a second membrane electrode assembly (MEA) 148 (electrolyte electrode assembly), and a second metal separator 150.

Figure 19:
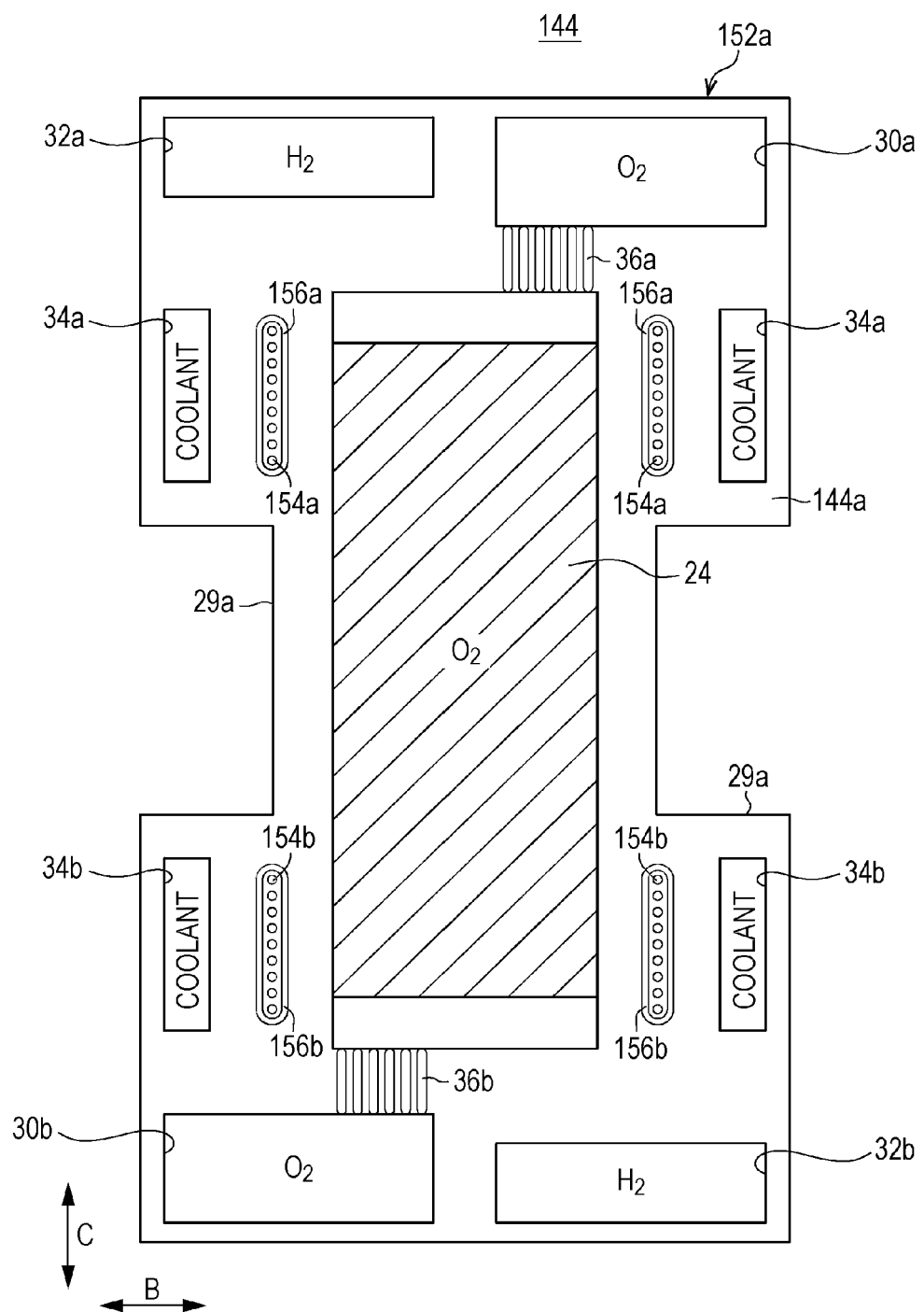
FIG. 19 illustrates a cathode surface of a first membrane electrode assembly of the fuel cell.

The first membrane electrode assembly 144 and the second membrane electrode assembly 148 respectively include a frame portion 152a (resin frame member) and a frame portion 152b (resin frame member). As illustrated in FIG. 19, in an upper part of each of end portions, in the width direction, of a cathode surface 144a side of the frame portion 152a, the inlet grooves 38a are not formed near a lower part of a corresponding one of the coolant inlet manifolds 34a. Instead, a plurality of inlet holes 154a are formed along the width directions of the coolant inlet manifold 34a (the directions of arrows C). The inlet holes 154a are surrounded by a ring-shaped inlet seal member 156a.

In a lower part of each of end portions, in the width direction, of the cathode surface 144a side of the frame portion 152a, the outlet grooves 38b are not formed near an upper part of a corresponding one of the coolant outlet manifolds 34b. Instead, a plurality of outlet holes 154b are formed along the width directions of the coolant outlet manifold 34b (the directions of arrows C). The outlet holes 154b are surrounded by a ring-shaped outlet seal member 156b.

Figure 20:
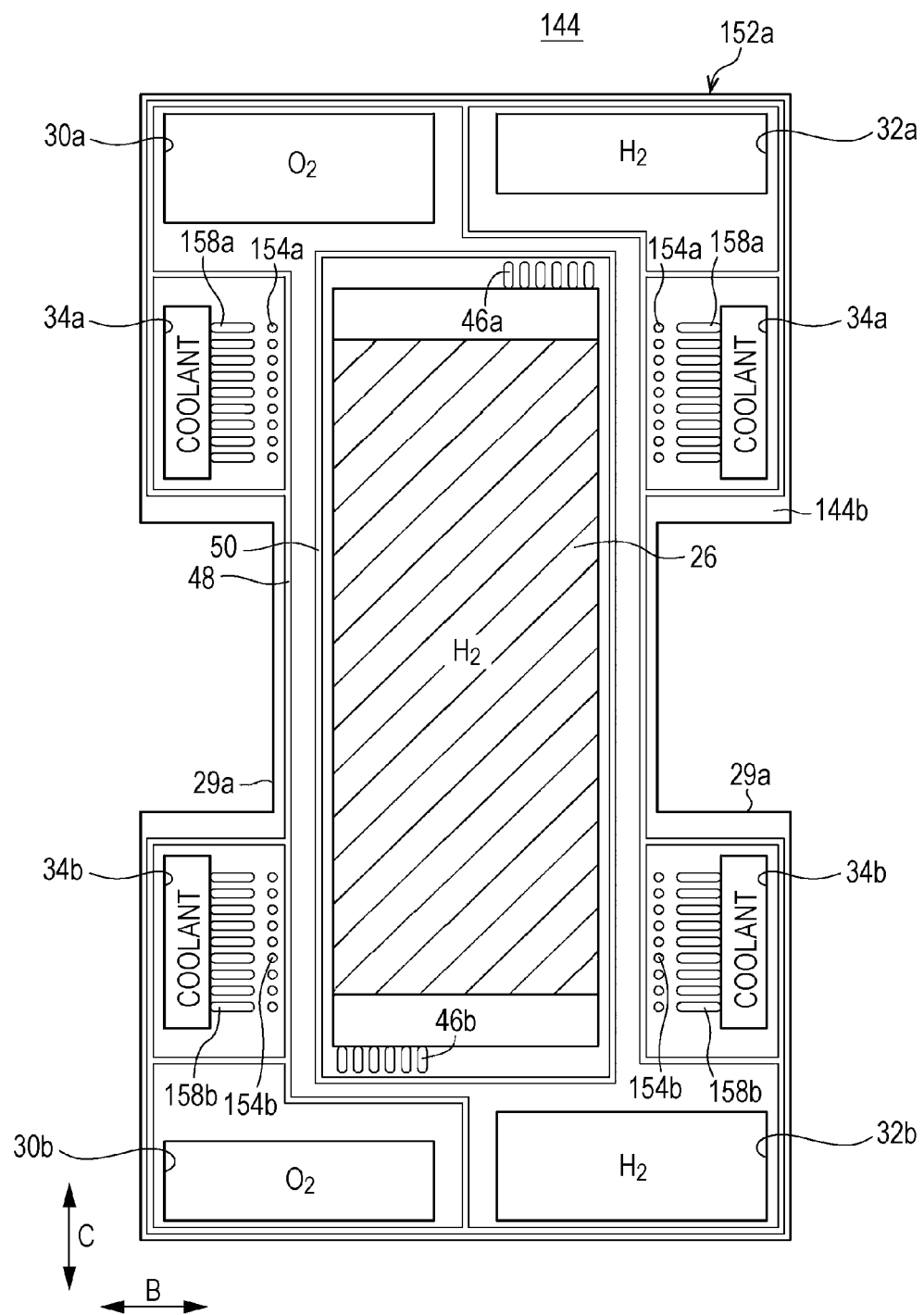
FIG. 20 illustrates an anode surface of the first membrane electrode assembly.

As illustrated in FIG. 20, in an upper part of each of end portions, in the width direction, of an anode surface 144b side of the frame portion 152a, a plurality of inlet grooves 158a corresponding to the plurality of inlet holes 154a are formed. In a lower part of each of end portions, in the width direction, of the anode surface 144b side of the frame portion 152a, a plurality of outlet grooves 158b corresponding to the plurality of outlet holes 154b are formed.

Figure 21:
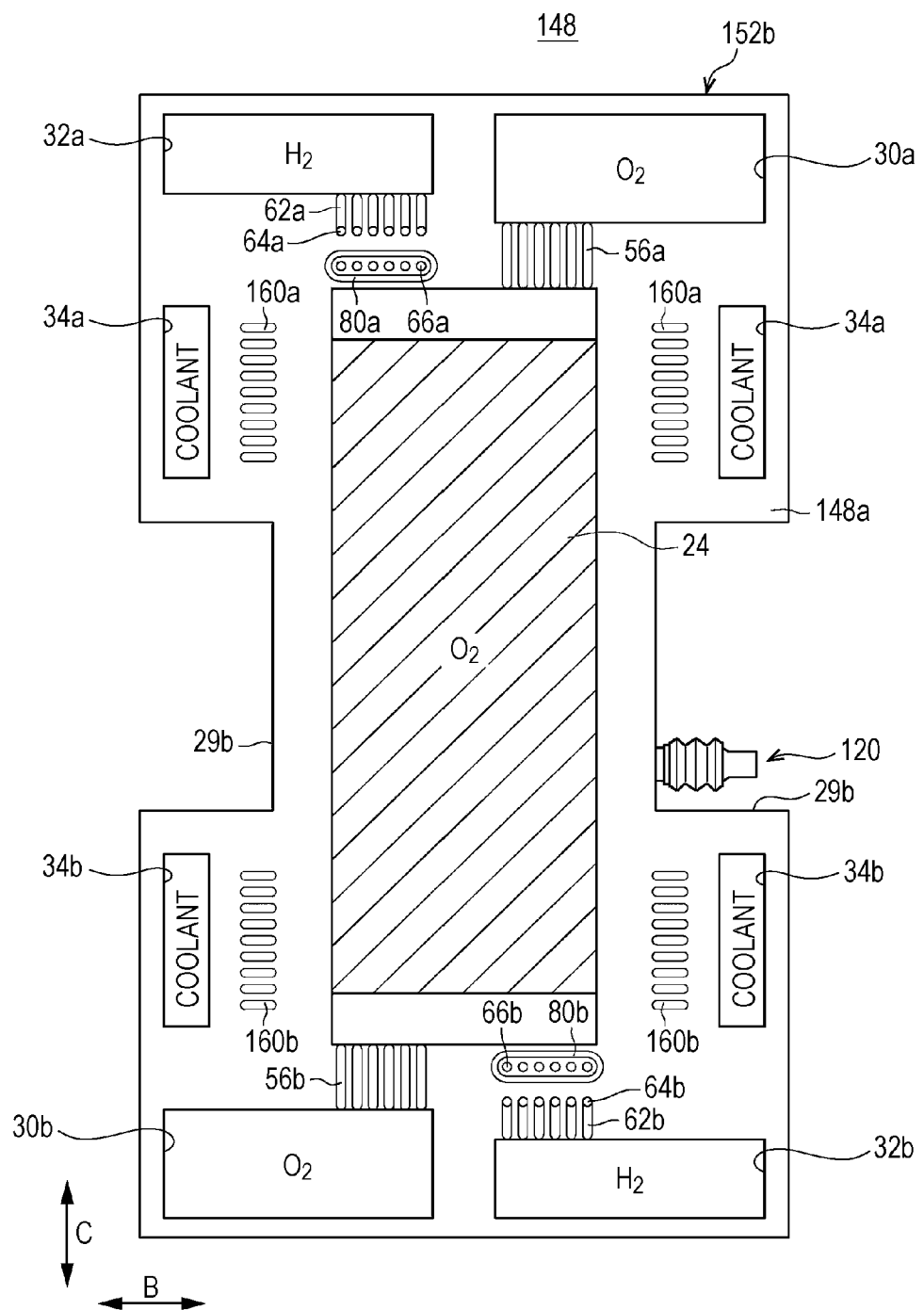
FIG. 21 illustrates a cathode surface of a second electrode assembly of the fuel cell.

As illustrated in FIG. 21, in an upper part of each of end portions, in the width direction, of a cathode surface 148a side of the frame portion 152b, the inlet holes 60a are not formed near a lower part of a corresponding one of the coolant inlet manifolds 34a. Instead, a plurality of inlet grooves 160a are formed along the width direction of the coolant inlet manifold 34a.

In a lower part of each of end portions, in the width direction, of the cathode surface 148a side of the frame portion 152b, the outlet holes 60b are not formed near an upper part of the coolant outlet manifold 34b. Instead, a plurality of outlet grooves 160b are formed along the width direction of the coolant outlet manifold 34b.

Figure 22:
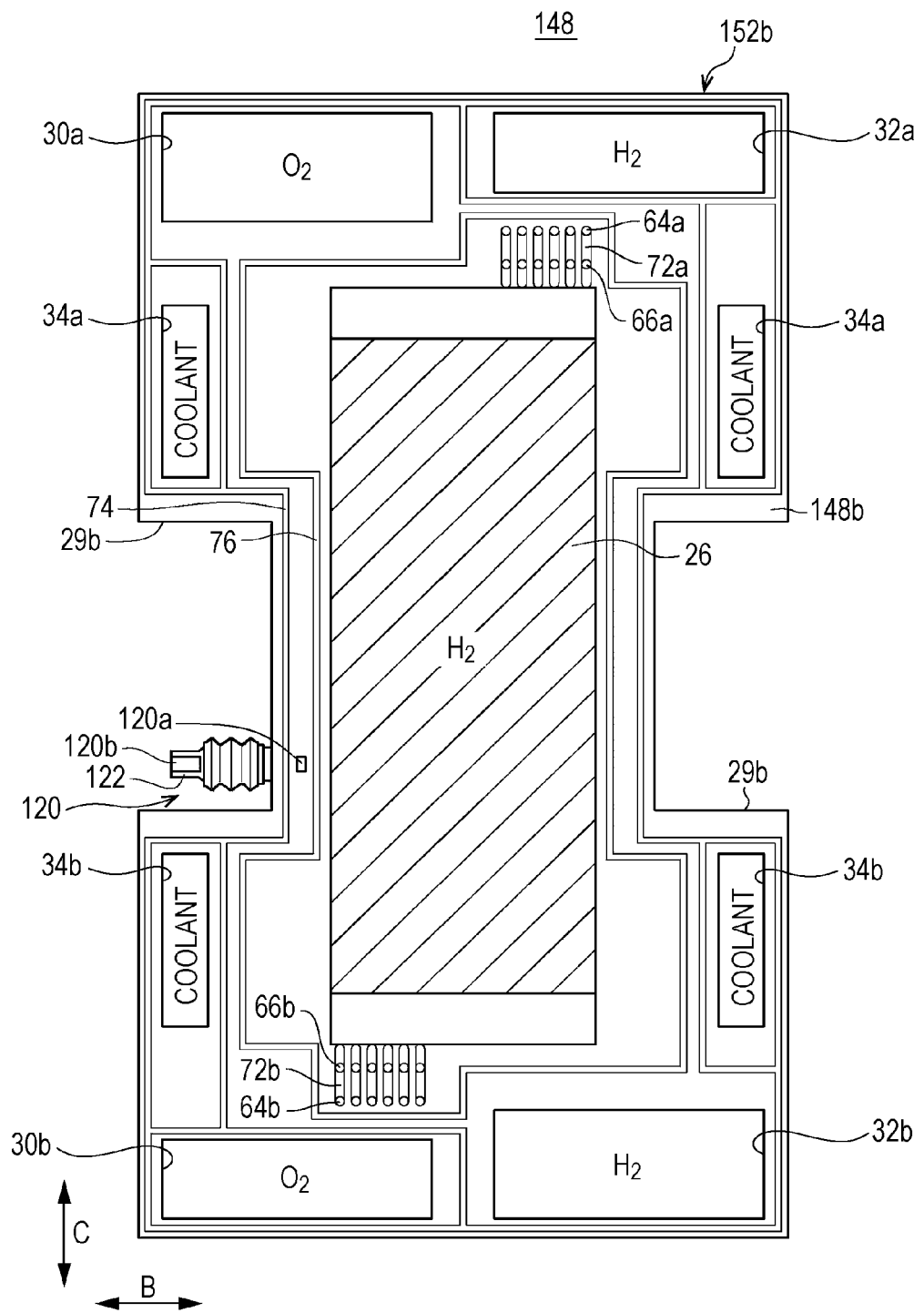
FIG. 22 illustrates an anode surface of the second electrode assembly.

As illustrated in FIG. 22, the inlet grooves 68a and the outlet grooves 68b are not formed on an anode surface 148b side of the frame portion 152b.

Figure 23:
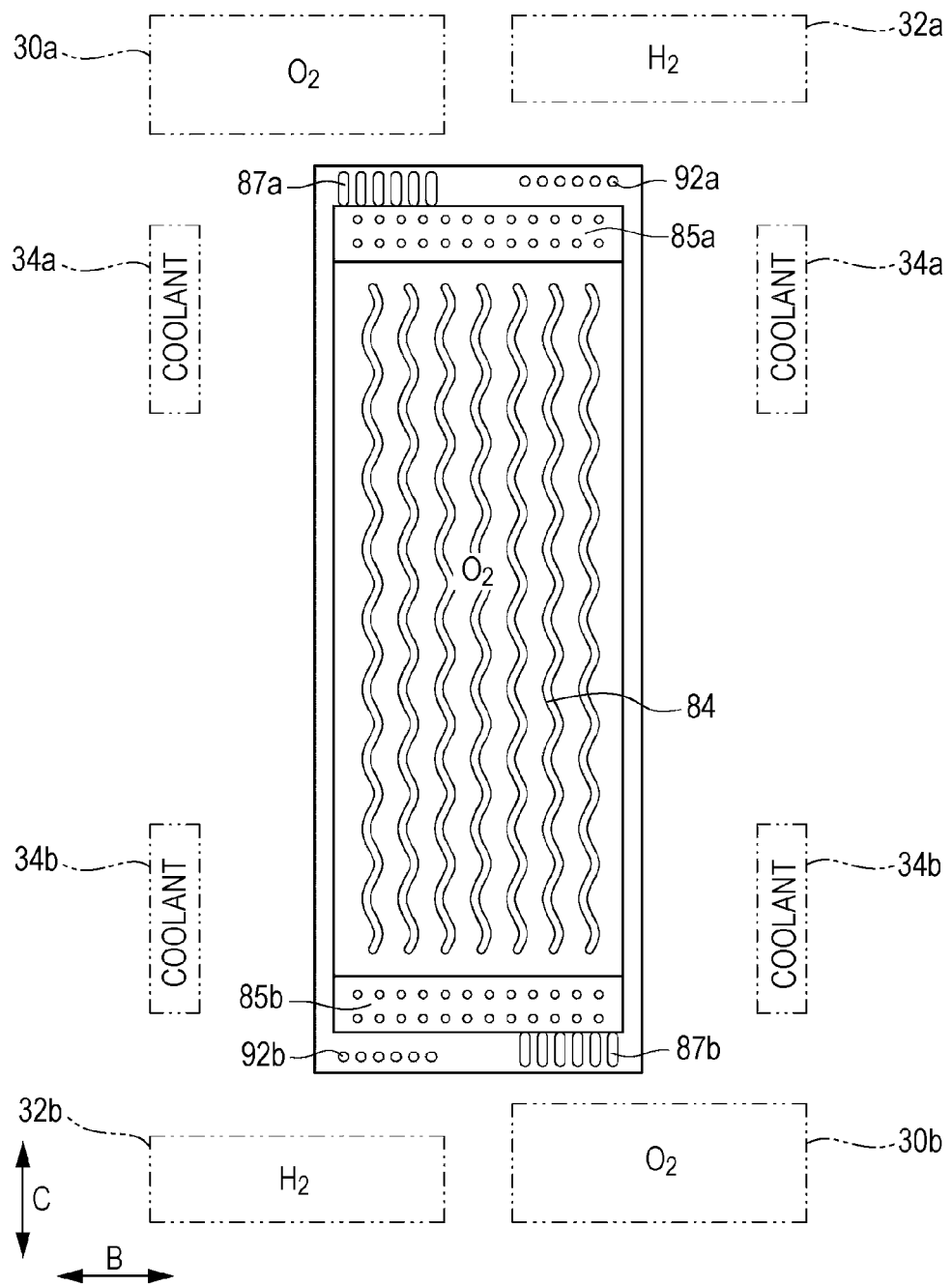
FIG. 23 illustrates a cathode surface of a first metal separator of the fuel cell.

The first metal separator 146 includes a single metal plate member. As illustrated in FIG. 23, the plurality of holes 92a and the plurality of inlet grooves 87a are formed above the oxidant gas channel 84, which is disposed on one of the surfaces of the first metal separator 146. The plurality of holes 92b and the plurality of outlet grooves 87b are formed below the oxidant gas channel 84.

The first metal separator 146 does not include the pairs of protrusions 89a and 89b at both ends in the width direction and the plurality of holes 90a and 90b are not formed.

As illustrated in FIG. 18, the second metal separator 150 includes two metal plates 162a and 162b (for example, stainless-steel plates) that have the same size and that are stacked. Outer peripheral edge portions of the metal plates 162a and 162b are integrated with each other by, for example, welding or bonding; and the space between the metal plates 162a and 162b is sealed. The oxidant gas channel 84 is formed on a surface of the metal plate 162a facing the cathode electrode 24. The fuel gas channel 86 is formed on a surface of the metal plate 162b facing the anode electrode 26. The coolant channel 88 is formed between the metal plates 162a and 162b.

Figure 24:
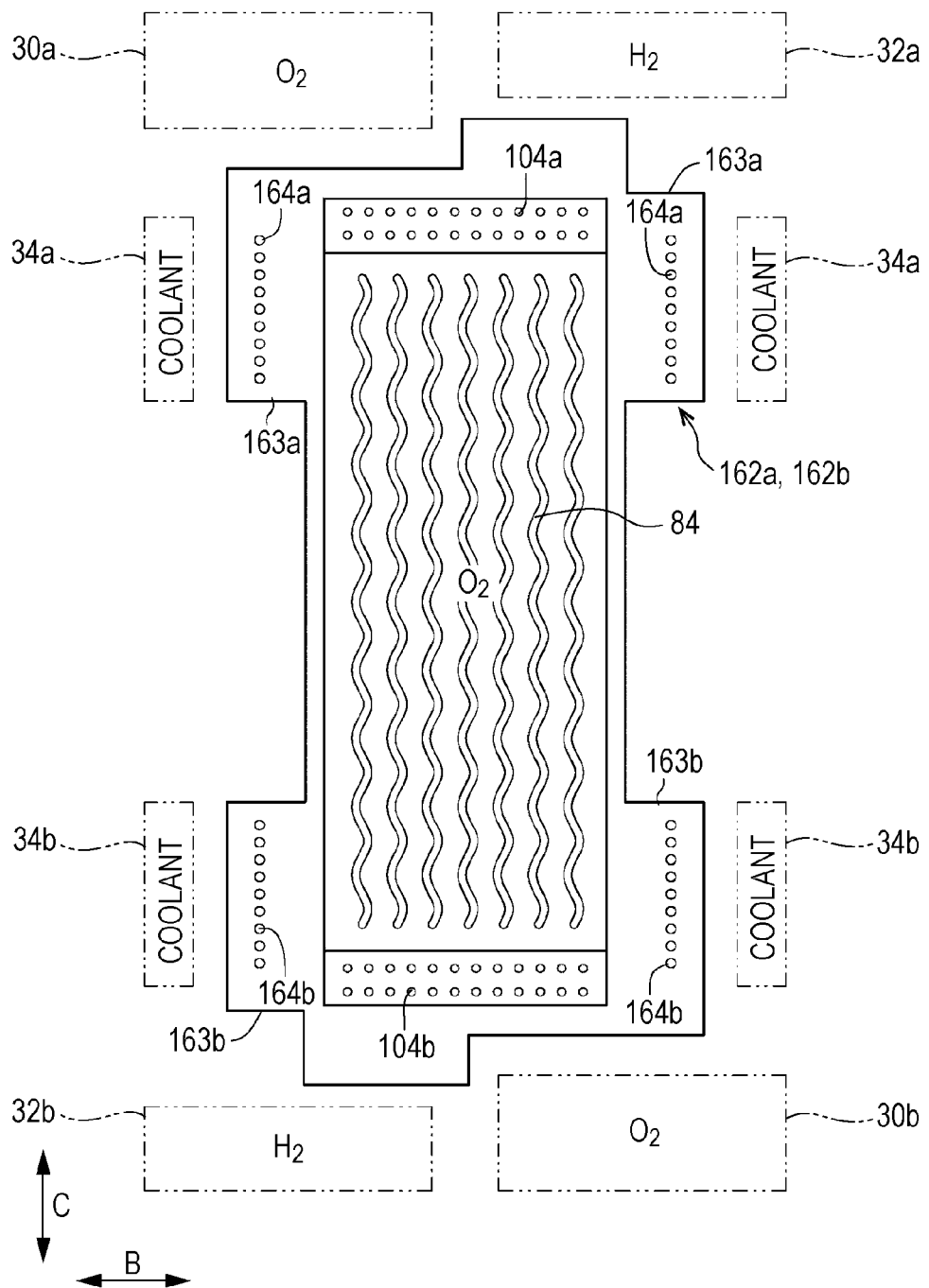
FIG. 24 illustrates a cathode surface of a second metal separator of the fuel cell.

As illustrated in FIG. 24, the metal plate 162a includes a pair of protrusions 163a in upper parts thereof at both ends in the width direction. Each of the protrusions 163a has a shape that is elongated in the directions of arrows C. A plurality of holes 164a are formed in each of the protrusions 163a along the width direction of a corresponding one of the coolant inlet manifolds 34a. The metal plate 162a includes a pair of protrusions 163b in lower parts thereof at both ends in the width direction. Each of the protrusions 163b has a shape that is elongated in the directions of arrows C. A plurality of holes 164b are formed in each of the protrusions 163b along the width direction of a corresponding one of the coolant outlet manifolds 34b.

Figure 25:
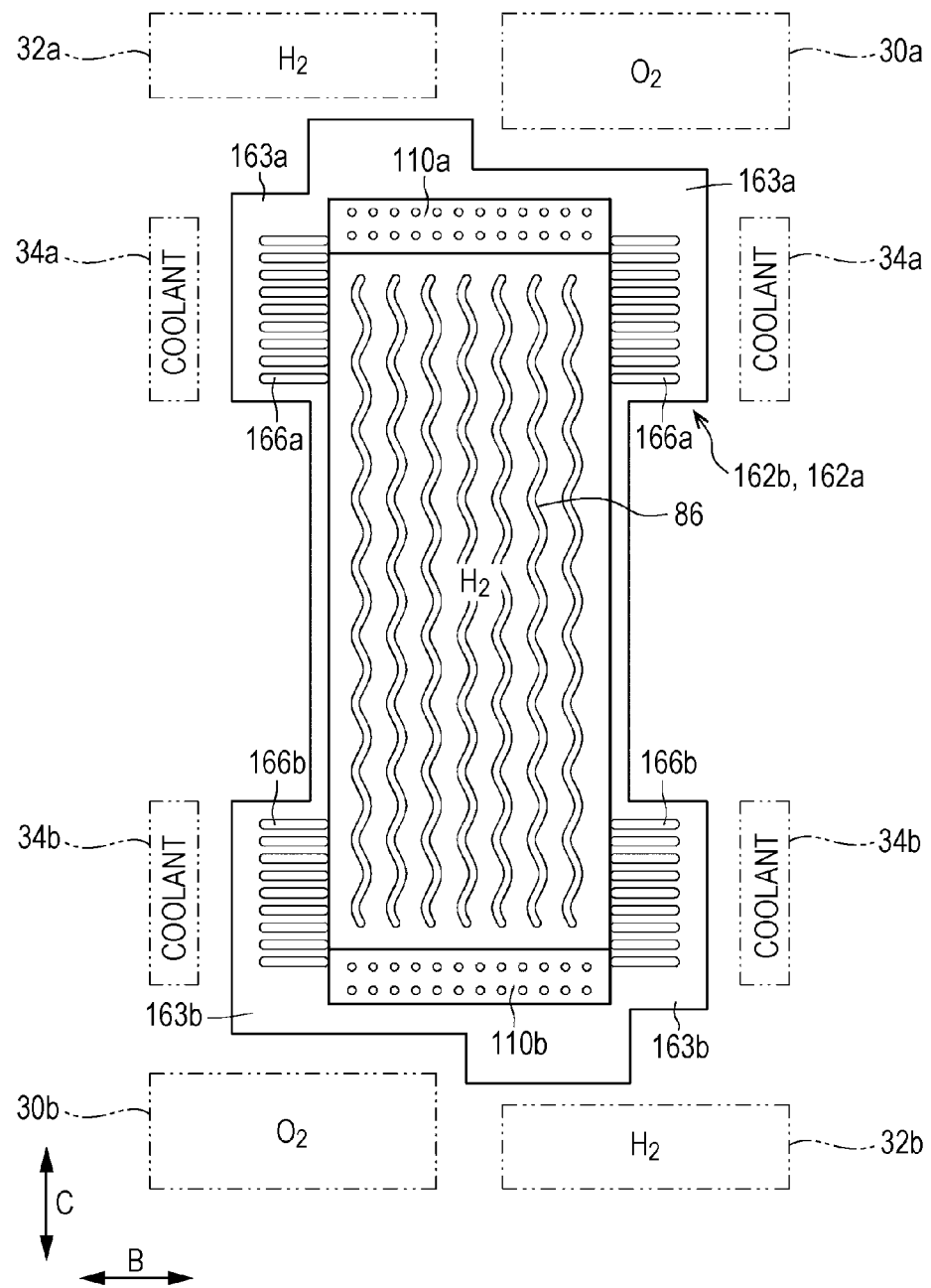
FIG. 25 illustrates an anode surface of the second metal separator.

As illustrated in FIG. 25, a plurality of inlet grooves 166a are formed in each of the pair of protrusions 163a of the metal plate 162b along the width direction of a corresponding one of the coolant inlet manifolds 34a. A plurality of outlet grooves 166b are formed in each of the pair of protrusions 163b of the metal plate 162b along the width direction of a corresponding one of the coolant outlet manifolds 34b.

Figure 26:
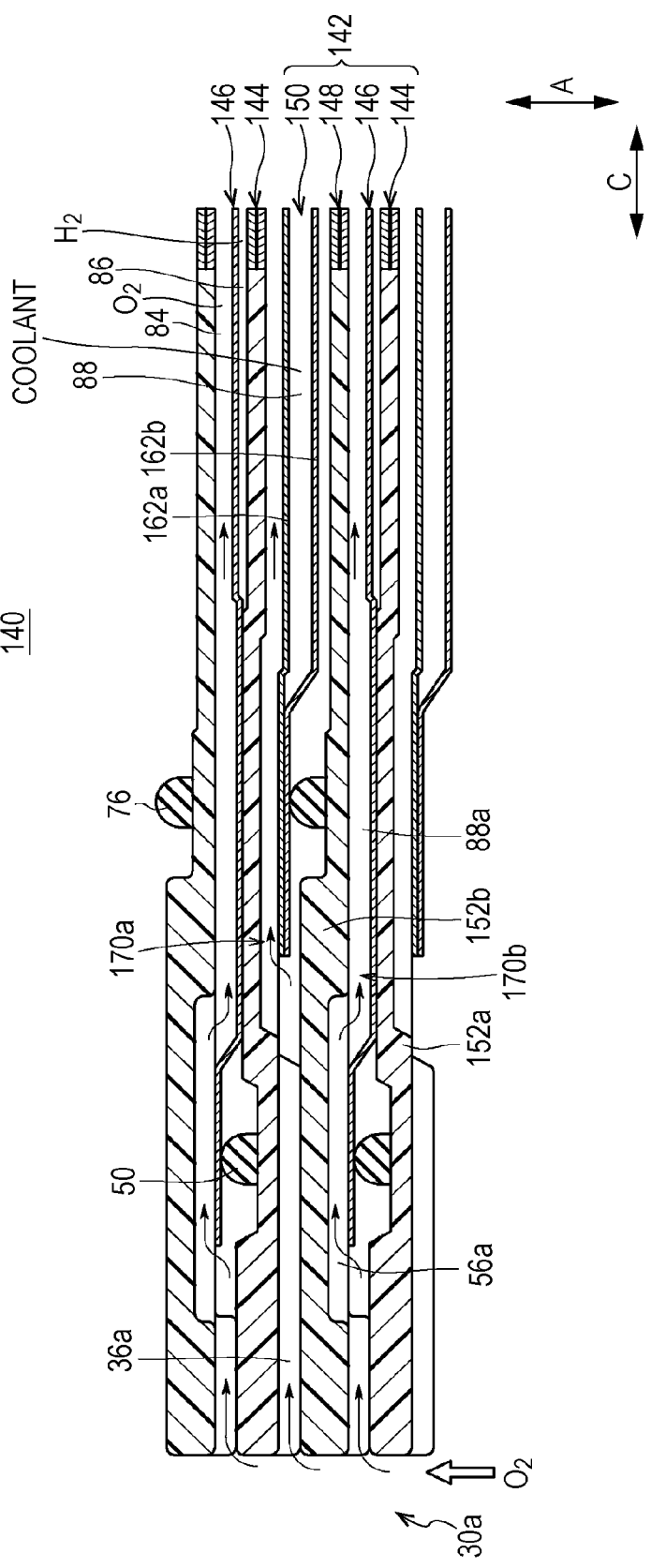
FIG. 26 is a sectional view of the fuel cell taken along line XXVI-XXVI of FIG. 17.

As illustrated in FIG. 26, an oxidant gas connection channel 170a and an oxidant gas connection channel 170b are formed between the frame portions 152a and the frame portions 152b that are disposed adjacent to each other in the stacking direction. The oxidant gas connection channel 170a connects the oxidant gas inlet manifold 30a to the oxidant gas channel 84 of the first membrane electrode assembly 144. The oxidant gas connection channel 170b connects the oxidant gas inlet manifold 30a to the oxidant gas channel 84 of the second membrane electrode assembly 148. Another oxidant gas connection channel (not shown), which connects the oxidant gas outlet manifold 30b to the oxidant gas channel 84, is formed between the frame portions 152a and 152b.

Figure 27:
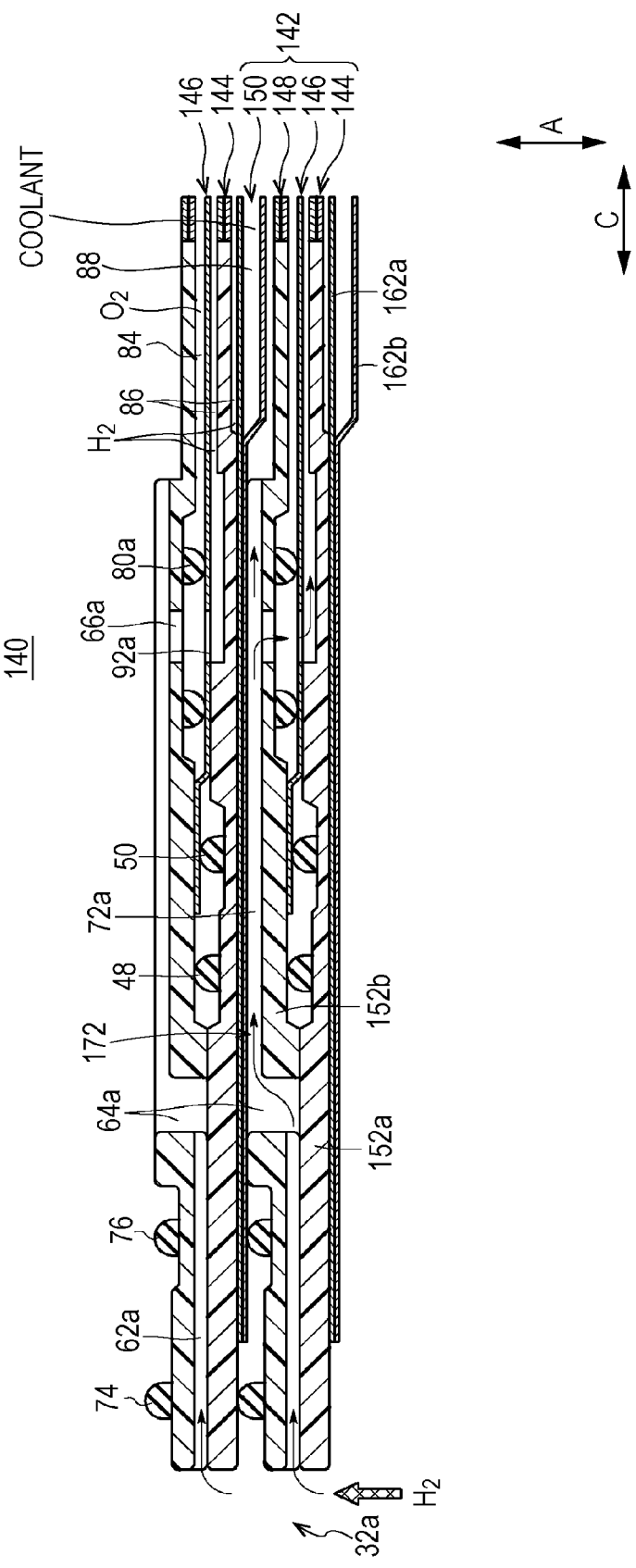
FIG. 27 is a sectional view of the fuel cell taken along line XXVII-XXVII of FIG. 17.

As illustrated in FIG. 27, a fuel gas connection channel 172 is formed between the frame portions 152a and 152b that are disposed adjacent to each other in the stacking direction. The fuel gas connection channel 172 connects the fuel gas inlet manifold 32a to the fuel gas channel 86. Another fuel gas connection channel (not shown), which connects the fuel gas outlet manifold 32b to the fuel gas channel 86, is formed between the frame portions 152a and 152b.

Figure 28:
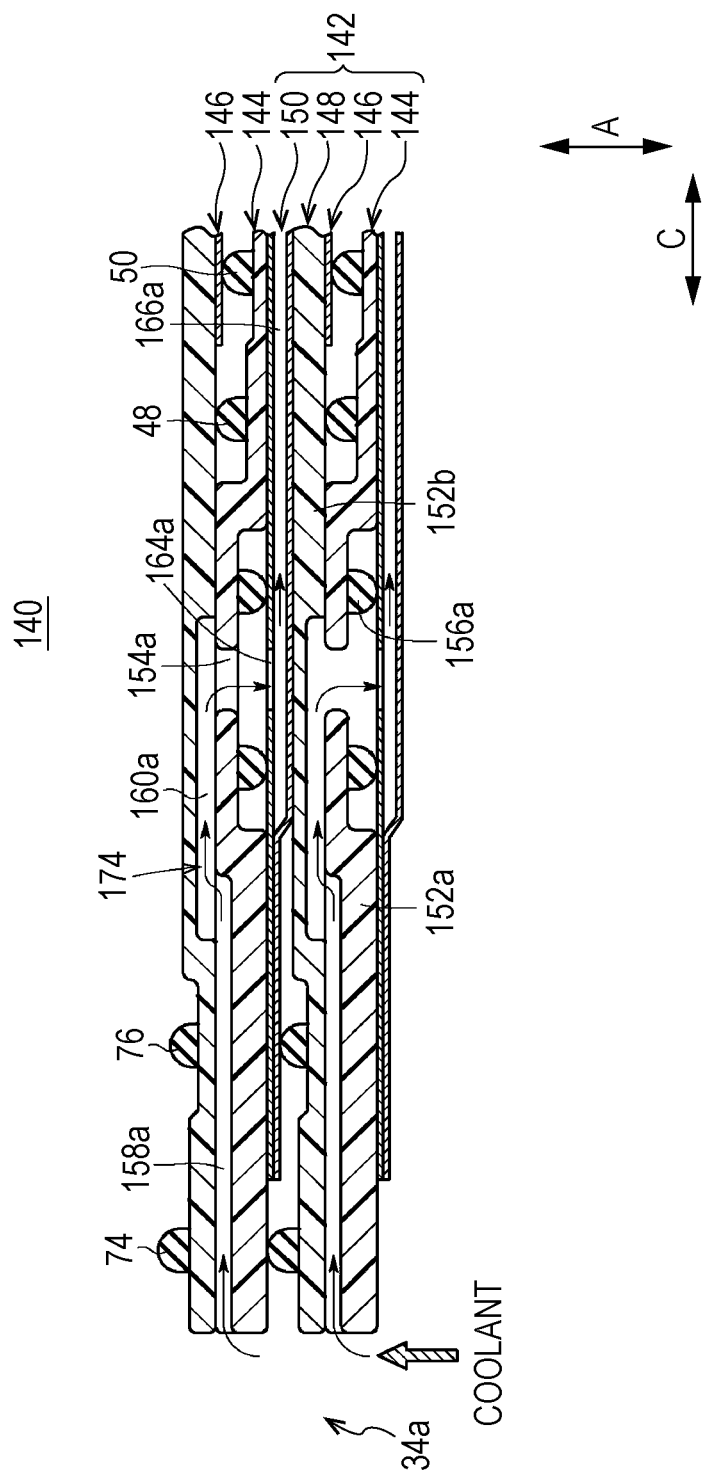
FIG. 28 is a sectional view of the fuel cell taken along line XXVIII-XXVIII of FIG. 17.
Figure 29:
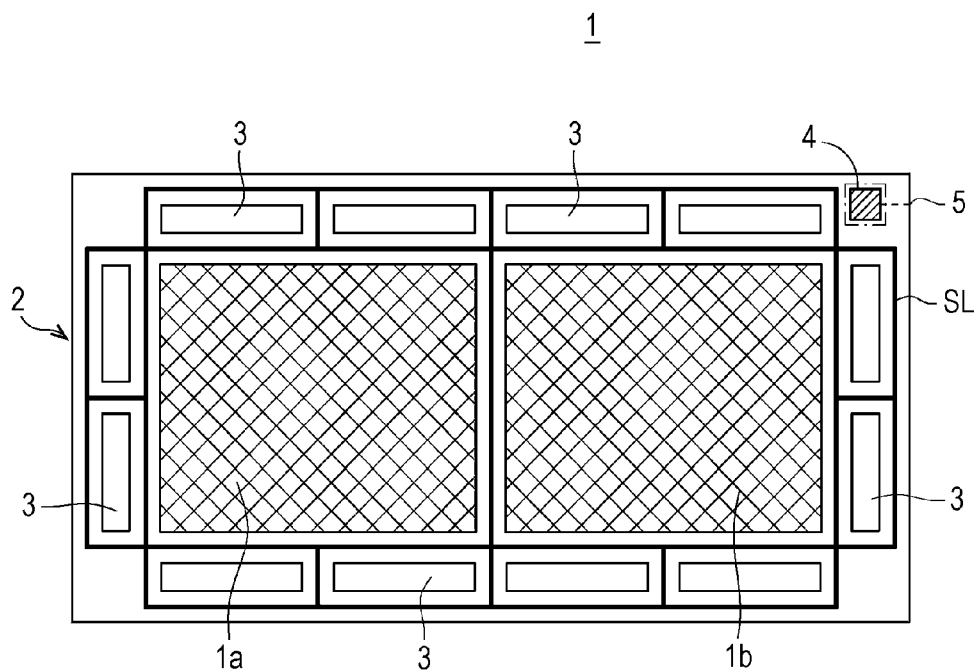
FIG. 29 illustrates a seal-gasket-integrated MEA of a fuel cell described in the related art.

As illustrated in FIG. 28, a coolant connection channel 174 is formed between the frame portions 152a and 152b that are disposed adjacent to each other in the stacking direction. The coolant connection channel 174 connects the coolant inlet manifold 34a to the coolant channel 88 of the second metal separator 150. Another coolant connection channel (not shown), which connects the coolant outlet manifold 34b to the coolant channel 88, is formed between the frame portions 152a and 152b.

The coolant connection channel 174 is formed because the outer seal member 48 and the inner seal member 50 of the frame portion 152a and the outer seal member 74 and the inner seal member 76 of the frame portion 152b are disposed at different positions in the stacking direction.

The coolant connection channel 174 includes the inlet grooves 158a and 160a, the inlet holes 154a (first holes), and the holes 164a (second holes). The inlet grooves 158a and 160a extend in the in-plane direction of the separator. The inlet holes 154a extend through the frame portion 152a in the stacking direction. The holes 164a extend through the metal plate 162a in the stacking direction. An end of each of the inlet grooves 158a is connected to an end of a corresponding one of the inlet grooves 160a.

As illustrated in FIGS. 17, 18, 21, and 22, the cell voltage monitor terminal 120 is embedded in the frame portion 152b of the second membrane electrode assembly 148. Alternatively, the cell voltage monitor terminal 120 may be embedded in the frame portion 152a of the first membrane electrode assembly 144.

As illustrated in FIG. 18, an outer peripheral edge portion of the first metal separator 146 is disposed between the inner seal member 50 and the outer seal member 48 of the first membrane electrode assembly 144. An outer peripheral edge portion of the second metal separator 150 is disposed between the inner seal member 76 and the outer seal member 74 of the second membrane electrode assembly 148.

The cell voltage monitor terminal 120 includes the exposed portion 120a between the inner seal member 76 and the outer seal member 74. The exposed portion 120a is in contact with an adjacent second metal separator 150. By turning the cell voltage monitor terminal 120 upside down in FIG. 18, the exposed portion 120a can be exposed to a space between the inner seal member 50 and the outer seal member 48 and can be made to come into contact with an adjacent first metal separator 146.

The operation of the fuel cell 140 will be schematically described below.

As illustrated in FIGS. 17 and 26, in each of the unit cells 142, oxidant gas is supplied to the oxidant gas inlet manifold 30a, and the oxidant gas is introduced to the inlet grooves 36a of the first membrane electrode assembly 144 and to the inlet grooves 56a of the second membrane electrode assembly 148.

The oxidant gas that has been introduced to the inlet grooves 36a is supplied to the oxidant gas channel 84 of the second metal separator 150. The oxidant gas, which has been supplied to the oxidant gas channel 84, is supplied to the cathode electrode 24 of the first membrane electrode assembly 144. Exhausted oxidant gas is discharged through the outlet grooves 36b to the oxidant gas outlet manifold 30b.

The oxidant gas that has been introduced to the inlet grooves 56a passes through the inlet grooves 87a between the second membrane electrode assembly 148 and the first metal separator 146 and is supplied to the oxidant gas channel 84 of the first metal separator 146. The oxidant gas, which has been supplied to the oxidant gas channel 84, is supplied to the cathode electrode 24 of the second membrane electrode assembly 148. Exhausted oxidant gas is discharged to the oxidant gas outlet manifold 30b through the outlet grooves 87b and 56b.

As illustrated in FIGS. 17 and 27, the fuel gas that has been supplied to the fuel gas inlet manifold 32a is introduced to the inlet grooves 62a on the cathode side of the second membrane electrode assembly 148. The fuel gas flows to the anode side through the inlet grooves 62a and the inlet holes 64a, and a part of the fuel gas is supplied to the fuel gas channel 86 of the second metal separator 150 through the inlet grooves 72a.

The remaining part of the fuel gas passes through the inlet holes 66a and the holes 92a in the first metal separator 146 and is introduced to the space between the first metal separator 146 and the first membrane electrode assembly 144. Then, the fuel gas is supplied to the fuel gas channel 86 of the first metal separator 146.

Exhausted fuel gas that has flowed through the fuel gas channel 86 of the second metal separator 150 is discharged to the outlet grooves 72b. Then, the exhausted fuel gas passes through the outlet holes 64b and the outlet grooves 62b and is discharged to the fuel gas outlet manifold 32b. Exhausted fuel gas that has flowed through the fuel gas channel 86 of the first metal separator 146 passes through the holes 92b and the outlet holes 66b and is discharged to the outlet grooves 72b. Then, the exhausted fuel gas is likewise discharged to the fuel gas outlet manifold 32b.

Thus, the oxidant gas and the fuel gas, which are respectively supplied to the cathode electrode 24 and the anode electrode 26, are consumed in electrochemical reactions in the electrode catalyst layers of the first membrane electrode assembly 144 and the second membrane electrode assembly 148, thereby generating electric power.

Moreover, as illustrated in FIGS. 17 and 28, a part of the coolant that has been supplied to a respective one of the pair of coolant inlet manifolds 34a is introduced to the inlet grooves 158a of the first membrane electrode assembly 144 and supplied through the inlet grooves 160a to the inlet holes 154a. The coolant passes through the inlet holes 154a and the holes 164a of the second metal separator 150 and is introduced into the second metal separator 150.

Parts of the coolant flow in the second metal separator 150 along the inlet grooves 166a so as to become closer to each other in the directions of arrows B and are supplied to the coolant channel 88. The parts of the coolant, which have flowed so as to become closer to each other, collide with each other in a middle part of the coolant channel 88 in the directions of arrows B, flow in the direction of gravity, and then bifurcate in both directions of arrows B in a lower part of the coolant channel 88. Then, the coolant passes through the outlet grooves 166b and the holes 164b and is discharged from the second metal separator 150. Subsequently, the coolant passes through the outlet holes 154b and the outlet grooves 160b and 158b and is discharged to the coolant outlet manifold 34b.

Thus, the first membrane electrode assembly 144 and the second membrane electrode assembly 148 are cooled in a skipped manner by the coolant, which flows through the coolant channel 88 of the second metal separator 150.

In the second embodiment, as illustrated in FIGS. 18, 21, and 22, the cell voltage monitor terminal 120, which is embedded in the frame portion 152b of the second membrane electrode assembly 148, is in contact with the second metal separator 150 between the inner seal member 76 and the outer seal member 74. Therefore, advantages similar to those of the first embodiment, such as that the cell voltage monitor terminal 120 can extend to the outside of the frame portion 152b without crossing the seal line, can be obtained.

According to the embodiment, a fuel cell includes a stack of an electrolyte electrode assembly and a metal separator. The electrolyte electrode assembly includes an electrolyte, a pair of electrodes disposed on both sides of the electrolyte, and a resin frame member integrally formed on an outer periphery of the electrolyte electrode assembly.

In the fuel cell, an inner seal member that extends around an electrode surface and an outer seal member that extends around an outer periphery of the inner seal member are disposed on the resin frame member, and a cell voltage monitor terminal is embedded in the resin frame member. An outer peripheral edge portion of the metal separator is disposed between the inner seal member and the outer seal member. The cell voltage monitor terminal includes an exposed portion between the inner seal member and the outer seal member, and the exposed portion is in contact with the metal separator, which is adjacent to the exposed portion.

In the fuel cell, it is preferable that the cell voltage monitor terminal be integrally embedded in the resin frame member when the resin frame member is molded, and the cell voltage monitor terminal be exposed on one side or on the other side of the resin frame member in accordance with an orientation of the cell voltage monitor terminal when the resin frame member is molded.

In the fuel cell, it is preferable that the cell voltage monitor terminal be integrally provided with a resin member that protrudes outward from an outer periphery of the resin frame member, and the resin member be integrally formed with the resin frame member when the resin frame member is molded.

In the present application, the cell voltage monitor terminal, which is embedded in the resin frame member, is in contact with the metal separator at a position between the inner seal member and the outer seal member. Therefore, the cell voltage monitor terminal can extend to the outside of the resin frame member without crossing the seal line, and thereby desired sealability can be obtained. Moreover, as compared with a structure in which a cell voltage monitor terminal directly extends from a metal separator, the size of the metal separator can be appropriately reduced, and reduction in the weight and the cost of the fuel cell can be easily achieved.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell comprising:
   an electrolyte electrode assembly comprising:
     an electrolyte;
     a pair of electrodes disposed on both sides of the electrolyte; and
     a resin frame member integrally provided on an outer periphery of the electrolyte electrode assembly;
   an inner seal member extending around the pair of electrodes;
   an outer seal member extending around an outer periphery of the inner seal member, the inner seal member and the outer seal member being disposed on the resin frame member;
   a metal separator stacked with the electrolyte electrode assembly and including an outer peripheral edge portion disposed between the inner seal member and the outer seal member; and
   a cell voltage monitor terminal embedded in the resin frame member, the cell voltage monitor terminal including an exposed portion provided between the inner seal member and the outer seal member, the exposed portion being in contact with the metal separator adjacent to the exposed portion,
   wherein the cell voltage monitor terminal and the metal separator are provided separately, and
   wherein one end of the cell voltage monitor terminal is exposed at the exposed portion between the inner seal member and the outer seal member, and an other end of the cell voltage monitor terminal is exposed from an outer periphery of the resin frame member.

2. The fuel cell according to claim 1,
   wherein the cell voltage monitor terminal is integrally embedded in the resin frame member when the resin frame member is molded, and
   wherein the cell voltage monitor terminal is exposed on one side or on another side of the resin frame member in accordance with an orientation of the cell voltage monitor terminal when the resin frame member is molded.

3. The fuel cell according to claim 1,
   wherein the cell voltage monitor terminal is integrally provided with a resin member that protrudes outward from the outer periphery of the resin frame member, and
   wherein the resin member is integrally formed with the resin frame member when the resin frame member is molded.

4. The fuel cell according to claim 1,
   wherein the cell voltage monitor terminal includes an exposed end portion disposed at a distal end of the cell voltage monitor terminal and provided on an outer peripheral side of the outer seal member.

5. The fuel cell according to claim 1,
   wherein the exposed portion is in contact with the outer peripheral edge portion of the metal separator.

6. The fuel cell according to claim 1,
   wherein an innermost edge of the cell voltage monitor terminal is disposed between the inner seal member and the outer seal member.

7. The fuel cell according to claim 1,
   wherein an innermost edge of the exposed portion of the cell voltage monitor terminal is disposed between the inner seal member and the outer seal member.

8. The fuel cell according to claim 1,
   wherein the cell voltage monitor terminal includes an embedded portion that is entirely embedded within the resin frame member such that the embedded portion is not exposed from a surface of the resin frame member, and
   wherein the embedded portion extends from an outer side of the outer seal member to an inner side of the outer seal member.

9. The fuel cell according to claim 8,
   wherein the embedded portion extends from an outer edge of the resin frame member to the inner side of the outer seal member.

10. The fuel cell according to claim 1,
    wherein the exposed portion is in direct contact with the metal separator at a location between the inner seal member and the outer seal member.

11. The fuel cell according to claim 1,
    wherein the cell voltage monitor terminal does not directly contact the outer seal member.

* * * * *